United States Patent
Johnson et al.

(10) Patent No.: US 8,417,442 B2
(45) Date of Patent: Apr. 9, 2013

(54) COLLECTION, MONITORING, ANALYZING AND REPORTING OF TRAFFIC DATA VIA VEHICLE SENSOR DEVICES PLACED AT MULTIPLE REMOTE LOCATIONS

(75) Inventors: Christopher S. Johnson, Tyrone, PA (US); Jason S. Geiger, Boulder, CO (US); John T. Graef, State College, PA (US)

(73) Assignee: Intuitive Control Systems, LLC, State College, PA (US)

( * ) Notice: Subject to any disclaimer, the term of this patent is extended or adjusted under 35 U.S.C. 154(b) by 1497 days.

(21) Appl. No.: 11/901,357

(22) Filed: Sep. 17, 2007

(65) Prior Publication Data

US 2008/0071467 A1 Mar. 20, 2008

Related U.S. Application Data

(60) Provisional application No. 60/845,796, filed on Sep. 19, 2006.

(51) Int. Cl.
*G06G 1/00* (2006.01)

(52) U.S. Cl. ...... 701/118; 701/32.7; 701/34.4; 701/414; 701/423; 701/534; 375/130; 375/152; 370/320; 370/335; 370/342; 455/231; 455/343.2; 340/990; 340/991; 342/457

(58) Field of Classification Search .................. 701/118, 701/517; 365/185.17, 185.22, 201, 185.12, 365/189.05, 194, 185.18; G9B/19.017, 20.01, G9B/20.035, 27.025, 7.034, 20.028, 5.188; 375/326, 130, 152, 343, E1.018; 370/335, 370/342, 320; 340/990, 991; 342/457; 714/718, 714/721; 455/231, 343.2; 368/10
See application file for complete search history.

(56) References Cited

U.S. PATENT DOCUMENTS

| | | | |
|---|---|---|---|
| 5,231,393 A | 7/1993 | Strickland | |
| 5,381,155 A | 1/1995 | Gerber | |
| 6,046,696 A | 4/2000 | Blanco | |
| 6,060,984 A * | 5/2000 | Braun et al. | 340/442 |
| 6,631,384 B1 * | 10/2003 | Richman et al. | 1/1 |

(Continued)

OTHER PUBLICATIONS

Product brochure for "SPEEDsentry• Radar Speed Display & Trailer," Intuitive Control Systems, LLC (d/b/a All Traffic Solutions (ATS)), State College, Pennsylvania, printout date: approximately Jun. 2004, 4 pages.

(Continued)

*Primary Examiner* — McDieunel Marc
(74) *Attorney, Agent, or Firm* — Panitch Schwarze Belisario & Nadel LLP

(57) ABSTRACT

Traffic management reports are created by providing vehicle sensor devices at different location in a region. Each device captures data of vehicles that pass the device. The vehicle data is communicated to a central computer database. At the central computer database, a user interface selects one or more criteria from a plurality of criteria for filtering the vehicle data. Traffic management reports are then automatically created from the filtered vehicle data using the selected criteria.

40 Claims, 42 Drawing Sheets

Three possible methods of gathering data from the Radar Speed Sign

U.S. PATENT DOCUMENTS

| | | | |
|---|---|---|---|
| 6,650,948 B1 * | 11/2003 | Atkinson et al. | 700/66 |
| 6,681,195 B1 | 1/2004 | Poland et al. | |
| 6,690,294 B1 | 2/2004 | Zierden | |
| 6,809,656 B2 | 10/2004 | Mitchell et al. | |
| 6,853,913 B2 * | 2/2005 | Cherveny et al. | 701/208 |
| 6,985,827 B2 | 1/2006 | Williams et al. | |
| 7,057,531 B1 * | 6/2006 | Okunuga | 340/936 |
| 7,151,976 B2 * | 12/2006 | Lin | 700/108 |
| 2002/0140924 A1 * | 10/2002 | Wangler et al. | 356/28 |
| 2002/0194016 A1 * | 12/2002 | Moribe et al. | 705/1 |
| 2003/0182051 A1 * | 9/2003 | Yamamoto | 701/200 |
| 2005/0206531 A1 | 9/2005 | Noel | |
| 2005/0248469 A1 * | 11/2005 | DeKock et al. | 340/905 |
| 2006/0253246 A1 * | 11/2006 | Cera et al. | 701/117 |
| 2007/0067410 A1 * | 3/2007 | Mulligan | 709/217 |
| 2007/0144814 A1 * | 6/2007 | Arnold et al. | 180/402 |
| 2007/0239569 A1 * | 10/2007 | Lucas et al. | 705/28 |
| 2008/0074117 A1 * | 3/2008 | Kamel et al. | 324/503 |
| 2010/0229096 A1 * | 9/2010 | Maiocco et al. | 715/734 |
| 2010/0255772 A1 * | 10/2010 | Hellman | 455/3.06 |

OTHER PUBLICATIONS

Decatur SpeedTrak Radar Trailer SST w/K-Band Antenna & LED Display, printout from web page: http://www.radarguns.com/decatur-radar-guns-trailersst.html, printout date: Apr. 24, 2006, original posting date: unknown, 2 pages.

Decatur Stat Pak Traffic Data Logger for Police Radar, LIDAR, Radar Trailers, printout from web page: http://www.opticsplanet.net/printable-decatur-stat-pak-traffic-data-logger.html, printout date: Apr. 24, 2006, original posting date: unknown, 2 pages.

Ingram Technologies Traffic Radar, Speed Signs, Speed Trailer, Speed Monitoring Trailer, printout from web page: <http://www.ingram-tech.com/us_signs.htm>, printout date: Apr. 24, 2006, original posting date: unknown, 4 pages.

* cited by examiner

Three possible methods of gathering data from the Radar Speed Sign

Communication Module Process Diagram

Speed Sign Server Communications Software Process Diagram

Database Entity Relationship Diagram

Database Entity Relationship Diagram

Database Entity Relationship Diagram

Database Entity Relationship Diagram

SPEEDsentry Sign Location Settings

Each Location you've created has it's own settings and parameters for effectively displaying speeds to the public while making good use of it's own battery power. To make changes to any of these, press the edit button beside the location you wish to modify, make your changes, and press Update when you are finished.

| | Current Location | Product Name | Last Login | Digit Display Type | Sign Mode | Posted Speed Limit | Display Trigger | Strobe Trigger | Relay Trigger | Data Logging | Radar Settings |
|---|---|---|---|---|---|---|---|---|---|---|---|
| Edit | Easterly Parkway, East of Elem School | 12" Sign 1 | 7/20/2006 5:38:49 PM | Constant | Radar On Always | 25 | All Vehicles | Off | Specific Speed: 45 | ☑ | Type SI3. Sensitivity: 10 |
| Edit | NJ Turnpike, Exit 11 Lane 12 | 15" NJ Turnpike Debug Unit | 8/16/2006 6:58:44 AM | Constant | Radar On Always | 15 | Speed Limit | Off | Off | ☑ | Type SI3. Sensitivity: 14 |
| Edit | Main Street, 500 Block | 18" Sign 3 | 4/17/2006 4:36:04 PM | Constant | Speed Limit Sign, Reduced Speed Limit: 15, Window 1: 7:00 AM to 1:00 PM, Window 2: 4:00 PM to 6:00 PM | 35 | Specific Speed: 15 | Specific Speed: 40 | Specific Speed: 40 | ☑ | Type SI2. Distance: 500 |

Figure 11

WebEmpowered Scheduling

Each Location that you have has it's own schedule for checking for updates from the server and uploading it's speed data into the database.
To make changes to any of these, press the Edit button beside the location you wish to modify, make your changes, and press Update when you are finished.

| | Get Data ASAP | Product Name | Current Location | Settings Check | Data Upload | Auto Upload |
|---|---|---|---|---|---|---|
| Edit | Enable | 12" Sign 1 | Easterly Parkway, East of Elem School, WB | 12 hour(s) | 1 day(s) at 11:40 AM | 99 % Full |
| Edit | Enable | 15" NJ Turnpike Debug Unit | NJ Turnpike, Exit 11 Lane 12, NB | 6 hour(s) | 1 day(s) at 11:29 AM | 85 % Full |
| Edit | Enable | 18" Sign 3 | Main Street, 500 Block, NB | 12 hour(s) | 1 day(s) at 8:56 AM | 35 % Full |

Figure 12

Current SPEEDsentry Filters and Associations

Each sign location can be associated with multiple data filters such as school zone, work zone, etc, to help you better report on your data.
To make changes to any of these, press the edit button beside the location

| | Product Name | Road Name | Location Name | Direction | School Zone | Work Zone | Season Study | Event Type |
|---|---|---|---|---|---|---|---|---|
| Edit | 12" Sign 1 | Easterly Parkway | East of Elem School | Westbound | Yes | No | None | Football Traffic |
| Edit | 15" NJ Turnpike Debug Unit | NJ Turnpike | Exit 11 Lane 12 | Northbound | No | No | Anytown Winter Study | Football Traffic |
| Edit | 18" Sign 3 | Main Street | 500 Block | Northbound | Yes | No | Anytown Summer Study | Football Traffic |

Quick Links:

Enable or Disable Custom Columns

Priority Enforcement Report

Custom generated for Anytown, USA (8/18/2006)

Report Criteria

Date Range: 3/1/2006 to 8/18/2006          Time Range: 12:00 AM to 11:59 PM
Roads: ALL ROADS
Locations: ALL LOCATIONS
Season Study: ALL SEASON STUDY
Event Type X: ALL EVENT TYPE X
Custom 3: ALL CUSTOM 3
Custom 4: ALL CUSTOM 4
Directions: Northbound, Southbound, Eastbound, Westbound
Group report Dates/Days by: Time and Date
School Zone: Any                           Work Zone: Any
SPEEDsentry Display: Any Display Setting   Police Enforcement: All times
Day(s) of Week: Mon, Tue, Wed, Thurs, Fri, Sat, Sun   Time Increment: 60 Minutes

Suggested Enforcement Targets

Worst Violation Times and Locations

| Road | Location | Dir. | Date | Start Time | End Time | Count | Speed Limit | Avg Speed |
|---|---|---|---|---|---|---|---|---|
| Moulstown Road | 4200 Block | WB | 4/26/2006 | 12:00 AM | 12:59 AM | 29 | 25 | 38.1 |
| Easterly Parkway | East of Elem School | WB | 4/25/2006 | 1:00 AM | 1:59 AM | 10 | 25 | 36.5 |
| Moulstown Road | 4200 Block | WB | 5/3/2006 | 3:00 AM | 3:59 AM | 11 | 25 | 36.2 |
| Easterly Parkway | East of Elem School | WB | 4/22/2006 | 12:00 PM | 12:59 PM | 33 | 25 | 36 |
| Easterly Parkway | East of Elem School | WB | 4/24/2006 | 5:00 AM | 5:59 AM | 12 | 25 | 34.9 |

Individual Speed Events

| Road | Location | Direction | Time/Date | Speed Limit | Speed | Over by |
|---|---|---|---|---|---|---|
| Moulstown Road | 4200 Block | WB | 4/26/2006 12:48:00 AM | 25 | 59 | 34 |
| Main Street | By Quick Shop | WB | 5/7/2006 6:30:00 PM | 25 | 59 | 34 |
| Moulstown Road | 4200 Block | WB | 4/29/2006 4:38:00 PM | 25 | 58 | 33 |
| Main Street | By Quick Shop | WB | 6/8/2006 7:36:00 PM | 25 | 57 | 32 |
| Easterly Parkway | East of Elem School | WB | 4/21/2006 5:57:00 PM | 25 | 55 | 30 |

Summary

| Road | Location | Direction | Speed Limit | Avg Speed | Avg Over | National Average | 85% Speed | Highest Speed | Vehicle Count |
|---|---|---|---|---|---|---|---|---|---|
| Main Street | By Quick Shop | WB | 25 | 29.6 | 4.6 | 29.2 | 34 | 59 | 105739 |
| Moulstown Road | 4200 Block | WB | 25 | 32.1 | 7.1 | 29.2 | 37 | 59 | 21057 |
| Easterly Parkway | East of Elem School | WB | 25 | 31.6 | 6.6 | 29.2 | 36 | 55 | 7771 |

Road Summary Report

Custom generated for Anytown, USA (8/18/2006)

Report Criteria

| | |
|---|---|
| Date Range: 3/1/2006 to 8/1/2006 | Time Range: 12:00 AM to 11:59 PM |
| Roads: ALL ROADS | |
| Locations: ALL LOCATIONS | |
| Season Study: ALL SEASON STUDY | |
| Event Type X: ALL EVENT TYPE X | |
| Custom 3: ALL CUSTOM 3 | |
| Custom 4: ALL CUSTOM 4 | |
| Directions: Northbound, Southbound, Eastbound, Westbound | |
| Group report Dates/Days by: Time and Date | |
| School Zone: Any | Work Zone: Any |
| SPEEDsentry Display: Any Display Setting | Police Enforcement: All times |
| Day(s) of Week: Mon, Tue, Wed, Thurs, Fri, Sat, Sun | Time Increment: 60 Minutes |

Volume Highlights

Peak Volumes

| Road | Location | Direction | Day | Date | Start Time | End Time | Count | Avg Speed |
|---|---|---|---|---|---|---|---|---|
| Main Street | By Quick Shop | WB | Tues | 5/24/2006 | 12:00 PM | 12:59 PM | 2419 | 29.7 |
| Main Street | By Quick Shop | WB | Tues | 5/24/2006 | 1:00 PM | 1:59 PM | 2382 | 29.2 |
| Main Street | By Quick Shop | WB | Tues | 5/24/2006 | 5:00 PM | 5:59 PM | 2374 | 29 |
| Main Street | By Quick Shop | WB | Tues | 5/24/2006 | 3:00 PM | 3:59 PM | 2275 | 28.1 |
| Main Street | By Quick Shop | WB | Tues | 5/24/2006 | 11:00 AM | 11:59 AM | 2266 | 30.2 |

Lowest Volumes

| Road | Location | Direction | Day | Date | Start Time | End Time | Count | Avg Speed |
|---|---|---|---|---|---|---|---|---|
| Easterly Parkway | East of Elem School | WB | Fri | 4/22/2006 | 4:00 AM | 4:59 AM | 0 | |
| Easterly Parkway | East of Elem School | WB | Sun | 4/24/2006 | 4:00 AM | 4:59 AM | 0 | |
| Main Street | By Quick Shop | WB | Thur | 5/12/2006 | 5:00 PM | 5:59 PM | 0 | |
| Main Street | By Quick Shop | WB | Wed | 5/18/2006 | 9:00 PM | 9:59 PM | 0 | |
| Main Street | By Quick Shop | WB | Wed | 5/18/2006 | 10:00 PM | 10:59 PM | 0 | |

Figure 34A

Speed Highlights

Fastest Times

| Road | Location | Direction | Day | Date | Start Time | End Time | Count | Avg Speed |
|---|---|---|---|---|---|---|---|---|
| Moulstown Road | 4200 Block | WB | Tues | 4/26/2006 | 12:00 AM | 12:59 AM | 29 | 38.1 |
| Easterly Parkway | East of Elem School | WB | Mon | 4/25/2006 | 1:00 AM | 1:59 AM | 10 | 36.5 |
| Moulstown Road | 4200 Block | WB | Tues | 5/3/2006 | 3:00 AM | 3:59 AM | 11 | 36.2 |
| Easterly Parkway | East of Elem School | WB | Fri | 4/22/2006 | 12:00 PM | 12:59 PM | 33 | 36 |
| Easterly Parkway | East of Elem School | WB | Sun | 4/24/2006 | 5:00 AM | 5:59 AM | 12 | 34.9 |

Slowest Times

| Road | Location | Direction | Day | Date | Start Time | End Time | Count | Avg Speed |
|---|---|---|---|---|---|---|---|---|
| Easterly Parkway | East of Elem School | WB | Fri | 4/22/2006 | 4:00 AM | 4:59 AM | 0 | |
| Easterly Parkway | East of Elem School | WB | Sun | 4/24/2006 | 4:00 AM | 4:59 AM | 0 | |
| Main Street | By Quick Shop | WB | Thur | 5/12/2006 | 5:00 PM | 5:59 PM | 0 | |
| Main Street | By Quick Shop | WB | Wed | 5/18/2006 | 9:00 PM | 9:59 PM | 0 | |
| Main Street | By Quick Shop | WB | Wed | 5/18/2006 | 10:00 PM | 10:59 PM | 0 | |

Working Window Highlights

Busiest 2 hour Time Windows

| Road | Location | Direction | Start Time | End Time | Count | Avg Speed |
|---|---|---|---|---|---|---|
| Main Street | By Quick Shop | WB | 6:00 AM | 7:59 AM | 1054 | 29 |
| Main Street | By Quick Shop | WB | 4:00 PM | 5:59 PM | 648 | 29 |
| Main Street | By Quick Shop | WB | 10:00 AM | 11:59 AM | 645 | 30 |
| Main Street | By Quick Shop | WB | 12:00 PM | 1:59 PM | 643 | 29 |
| Main Street | By Quick Shop | WB | 12:00 PM | 1:59 PM | 641 | 30 |

Lightest 2 hour Time Windows

| Road | Location | Direction | Start Time | End Time | Count | Avg Speed |
|---|---|---|---|---|---|---|
| Moulstown Road | 4200 Block | WB | 12:00 AM | 1:59 AM | 0 | |
| Main Street | By Quick Shop | WB | 12:00 AM | 1:59 AM | 0 | |
| Easterly Parkway | East of Elem School | WB | 12:00 AM | 1:59 AM | 0 | |
| Easterly Parkway | East of Elem School | WB | 2:00 AM | 3:59 AM | 0 | |
| Main Street | By Quick Shop | WB | 2:00 AM | 3:59 AM | 0 | |

Summary by Locations

| Road | Location | Direction | Speed Limit | Avg Speed | 85% Speed | Vehicle Count | Fastest Hour (All Days Averaged) | Busiest Hour (All Days Averaged) |
|---|---|---|---|---|---|---|---|---|
| Main Street | By Quick Shop | WB | 25 | 29.6 | 34.3 | 105739 | 12:00 AM-12:59 AM | 5:00 PM-5:59 PM |
| Moulstown Road | 4200 Block | WB | 25 | 32.1 | 36.7 | 21057 | 6:00 PM-6:59 PM | 5:00 PM-5:59 PM |
| Easterly Parkway | East of Elem School | WB | 25 | 31.6 | 36.2 | 7771 | 2:00 PM-2:59 PM | 5:00 PM-5:59 PM |

| | |
|---|---|
| Performance Comparison Criteria | Select from the following criteria to compare your communities speed enforcement performance with similar communities or with all communities on the Web Empowered system.<br><br>Compare to data in system with the same criteria selected for your local data. Use data from the following communities (check all that apply):<br><br>⊙ All Communities (National Average)<br>○ Small Communities<br>○ Medium Communities<br>○ Large Communities<br>○ US Only |

Figure 36

COLLECTION, MONITORING, ANALYZING AND REPORTING OF TRAFFIC DATA VIA VEHICLE SENSOR DEVICES PLACED AT MULTIPLE REMOTE LOCATIONS

CROSS REFERENCE TO RELATED APPLICATION

This application claims the benefit of U.S. Provisional Patent Application No. 60/845,796 filed Sep. 19, 2006.

BACKGROUND TO THE INVENTION

Radar speed trailers (also, referred to as "radar trailers," "speed trailers" or "radar speed signs") are portable devices that capture vehicle speed as the vehicle passes the device. Typically, the device also includes a speed indicator and the posted speed limit. Radar speed trailers typically include optional data collection units that store data detected by the radar devices. The stored data may be downloaded into a computer for analysis, charting, and the like.

Intuitive Control Systems, LLC (d/b/a All Traffic Solutions (ATS)), State College, Pa., sells a radar speed sign called SPEEDsentry™ Radar Speed Display. The SPEEDsentry display uses a radar antenna to measure the speed of an approaching vehicle and then displays the speed. The SPEEDsentry is sold with a standard programming features included and a number of other optional features, including a data logging feature. The data logging feature will keep a running log in local memory of every speed measured by the radar and the time of the measurement. The radar sensor takes a periodic reading. All readings are saved to the unit's internal memory. The user of the SPEEDsentry periodically downloads this data directly to a Laptop/PC using a cable or indirectly via a PDA. This prior art method is illustrated in FIG. 1. The data file is given a name and stored. Generally the name would indicate a location where the data was taken and the date of data collection. From this data, the number of vehicles that have been detected by the SPEEDsentry can be estimated, and this information could also be stored. The vehicle count is almost always different than the number of radar measurements taken because a single vehicle will usually be detected multiple times. The vehicle count is determined from this data using a proprietary algorithm. The analysis software provided by ATS to view the data allows a user to look at one week of data at a time.

The downloaded data is very useful for those responsible for traffic control. In addition to the supplied proprietary software, the data can be imported into a spreadsheet program and manipulated and analyzed. Some of the useful information than can and is often obtained from the downloaded data includes:

1. Average speed (overall and for specific time periods/windows)
2. $85^{th}$ percentile speed
3. Maximum speeds can be determined by sorting the data on the spreadsheet
4. Road volume per time window
5. Car volume per speed range for each time window Traffic managers (e.g., law enforcement) are able to make appropriate decisions for traffic control and speed enforcement based on reports derived from the data. Such decisions can include where and when to provide police law enforcement. It can also provide road traffic volumes for making other volume dependent decisions.

While the downloaded data is very useful to customers for monitoring traffic and making appropriate decisions, there are significant drawbacks. These include the cumbersome nature of collecting the data, storing numerous data files in an organized fashion to allow searching at a later time, analyzing the data for trends and combining data from separate data files. In particular, each time a customer downloads data, it is placed in a separate file. If a customer has multiple SPEEDsentrys, each SPEEDsentry generates data files for each location where it recorded data. It is complicated to collect and organize this data and keep track of the multiple files. Furthermore, it is complicated to make comparisons between separate data sets. In sum, the current method of developing useful reports from the collected data is time-consuming and too complicated for the average traffic officer.

BRIEF SUMMARY OF THE INVENTION

Preferred embodiments of the present invention provide at least the following benefits:
1. Data from multiple sources can be placed into a common database.
2. Data from any number of sensor devices can be automatically and independently uploaded into a common database with near immediate access to reports on the data from any web browser.
3. Data sets can be identified by a plurality of names (e.g., up to 12 names) for later sorting and organizing. These names may include county or municipality, road name, location on the road, side of the road, speed limit, school zone, work zone, or the like. The names are determined by the user and determined by future studies. Dates are automatically included, as these are part of the data.
4. Data can be grouped by the named fields and used to generate reports over a broad range or a very narrow range depending on the criteria selected.
5. The system can sort the data automatically and determine for the traffic officer the time windows with the highest percentage of speed violations or the highest speed violation events within a selected data range.
6. The system can automatically generate summary charts that provide the user with a traffic and speed summary for a given data range, the summary including vehicle count, maximum and minimum speeds, average speeds, percentile speeds (e.g., $85^{th}$ percentile speeds), and can provide other information.
7. The system can provide the effectiveness decay rate of actual police enforcement by allowing the user to chart the speeds in a particular location and overlay times when an officer was present and providing on-site enforcement. The system can monitor the speed in the location and when the speeds creep back up to a set speed or multiple of the speed after the enforcement period, the officer can be notified to provide enforcement again and reduce the speeds.
8. The system can provide alerts including individual high speed events, tamper alerts, low average speed indicating a problem, and average speed above the set value. All of the alerts have settings that are configured by the user.
9. The system can provide road volume reports with variable length periods of minimum vehicular traffic and maximum traffic.
10. The system can compare speed and traffic volume statistics across multiple jurisdictions and across the nation to determine the effectiveness of a local program compared to a national average or other average or comparison statistics determined to be appropriate.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

FIGS. 7-15 show user interface display screens for implementing the systems and methods of FIGS. 2-5 in accordance with preferred embodiments of the present invention.

FIGS. 16-27 show a plurality of different reports that can be generated using the systems and methods of FIGS. 2-5 in accordance with preferred embodiments of the present invention.

Figure 28:
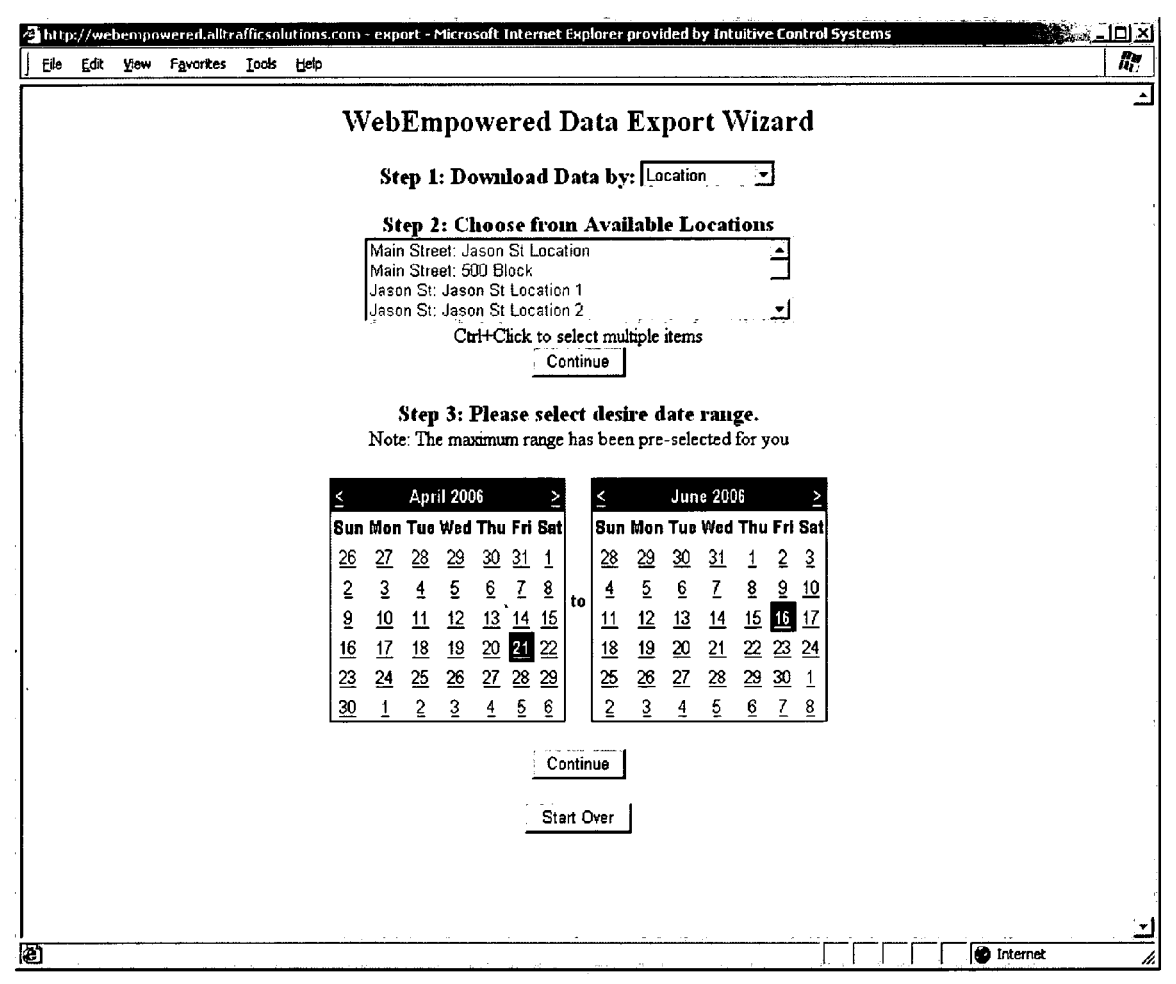

FIGS. 28-33 show additional user interface display screens for implementing the systems and methods of FIGS. 2-5 in accordance with preferred embodiments of the present invention.

FIGS. 34A-34B and 35A-35B show additional reports that can be generated using the systems and methods of FIGS. 2-5 in accordance with preferred embodiments of the present invention.

FIG. 36 shows a report criteria section where users can compare their data with other areas of the country to see where they stand in regards to effectiveness.

DETAILED DESCRIPTION OF THE INVENTION

Certain terminology is used herein for convenience only and is not to be taken as a limitation on the present invention.

I. Overview

The present invention is described in the context of a web-enabled service referred to as "WebEmpowered™ SPEEDSentry™, provided by All Traffic Solutions. This service provides a method for collecting and reporting on the data generated by SPEEDsentry installations. However, the scope of the present invention is not limited to this particular embodiment.

Figure 2:
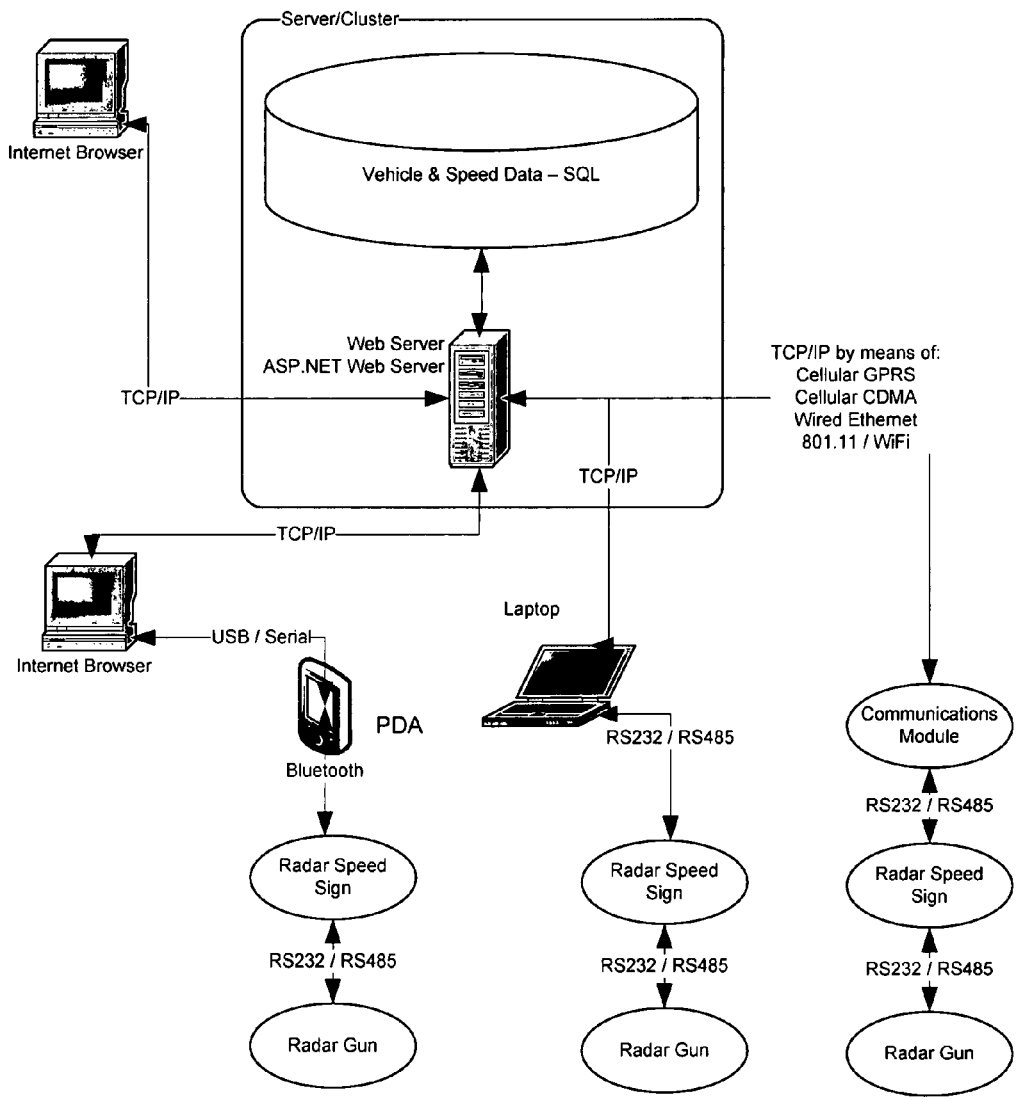
FIGS. 2-5 show systems and methods of capturing data from radar speed signs in accordance with preferred embodiments of the present invention.
Figure 3:
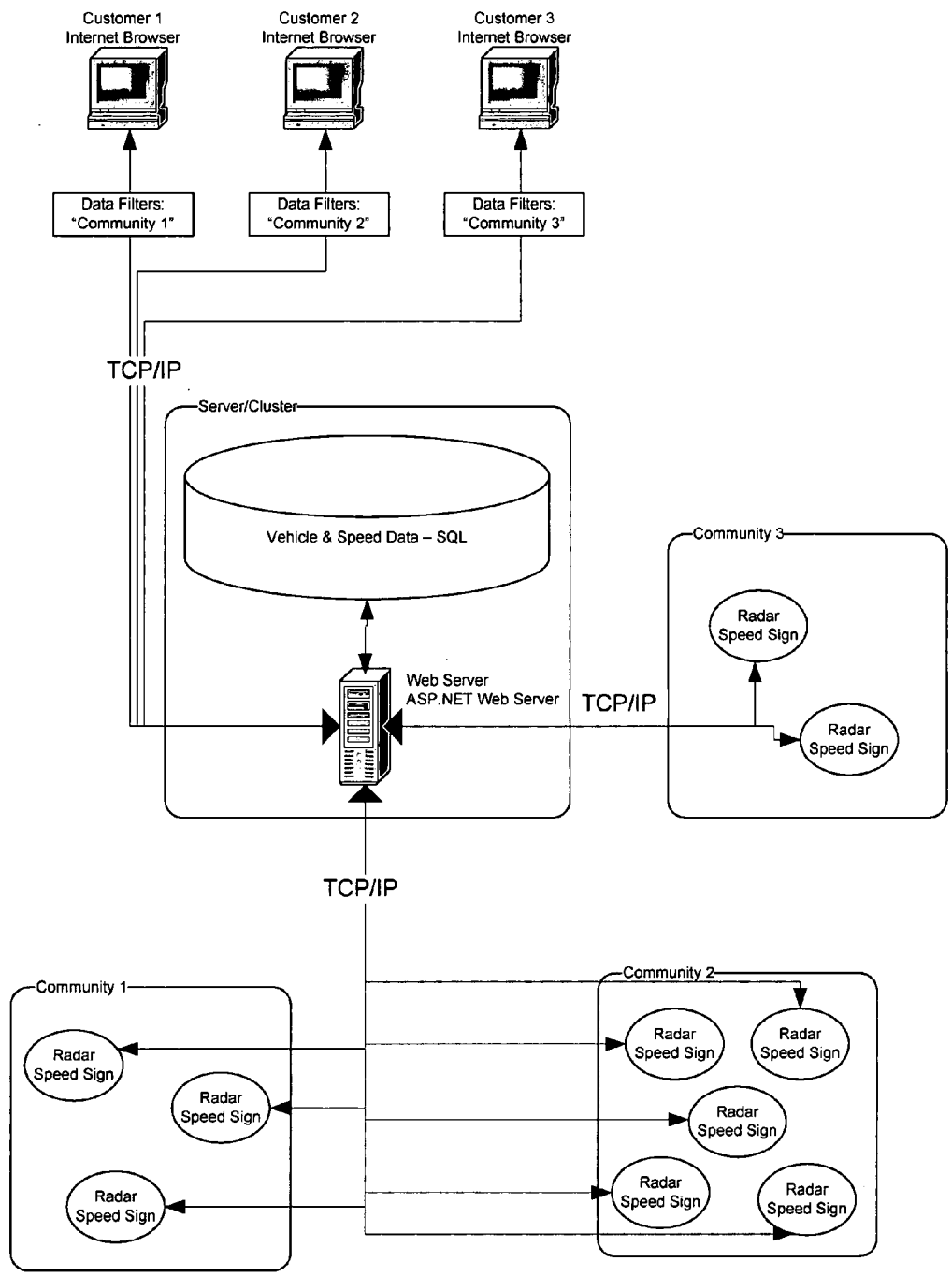

The general process is represented by FIGS. 2 and 3. In its simplest embodiment, the process includes at least the following steps:

1. Provide an installed base of multiple traffic sensing devices at different locations. The installed base optionally comprises multiple customers, each having at least one traffic sensing device installed at one or more locations.
2. Collect vehicle/traffic data from multiple locations (all or a subset of the installed base) as vehicles pass by the sensing devices (e.g., SPEEDsentry devices).
3. Transmit via electronic means (automatically or manually) the collected data to one or more databases, each aggregating data from multiple sensing devices.
4. Provide customer access to one or more predefined reports derived from the database(s) via a user interface (e.g., traffic management reports or traffic enforcement reports using selected for filtered data).

A. Providing an Installed Base

The first step of the process is to provide an installed base of traffic sensing devices. This can comprise a single customer having sensing devices at one or multiple locations or can be multiple customers at separate localities, each customer having one or more of such devices (e.g., the SPEEDsentry). The devices can be installed by the company, or the devices can be installed by the customer. For example, a local police force may install a single SPEEDsentry along five different residential streets in its jurisdiction at multiple different periods to collect speed data as vehicles pass by. The specific type of sensing equipment is not critical to the present invention. However, the most practical are devices that contain a standard radar antenna and are capable of collecting speed, date, time, a unique location/data source identifier, traffic directional identifier and radar selectivity/sensitivity data. Other types of sensors and other data collection systems are also within the scope of the invention. Laser speed sensors, road tubes and other road type sensors, infrared beams, acoustic sensors, piezoelectric sensors and many other technologies could be used to gather the data. The installed sensor base can contain devices of many different types and can range from being highly portable to permanent installations.

B. Data Collection

The next step of the process is to collect vehicle/traffic data from all or a subset of the installed base of devices as vehicles pass at least one sensing device at each location. This is preferably done at each location, and the data from one location has no relationship to the data from another location. In current practice, the data collected is speed, date, time, a unique location/data source identifier, traffic directional identifier and radar selectivity/sensitivity data. Other types of sensors and other data collection is also within the scope of the invention. The collected data and any locally generated derivative data (e.g., car count estimates, consolidated or compressed data, zero or no vehicles present data, rolling average speed) are temporarily stored in local memory until being periodically transmitted to a central database (also, referred to interchangeably as a "central computer database" or "centralized data center"). It is important to note that this collection is typically done automatically and independently at each location by local settings on the device. However, the settings can be changed from a remote location as will be discussed later. The calculations can also be performed on the server with only the raw data saved at the local device.

While the scope of the present invention including having only a single location for any one customer, the value of the present invention becomes significantly greater as the number of data collecting locations increases and the number of data sets increase as the unit(s) are placed to take data in these locations for more time periods. Thus, one preferred embodiment of the present invention is when there are multiple data collecting devices in a single local region (e.g., a municipality). Another preferred embodiment occurs when there are multiple localities (e.g., municipalities) that each have one or multiple data collecting devices. This particular version is represented in FIG. 3 which shows three separate/independent communities, each having multiple data collecting devices.

C. Data Transmission

The next step of the process is transmittal of the collected data via electronic means to a centralized computer/server where the data is stored in at least one common/central database that aggregates data from one or multiple devices and one or multiple locations. The specific electronic means that is used to transmit the data to the central server is not critical. FIG. 2 shows three different methods of getting collected data from radar speed signs to the server with the database software (e.g., SQL, Microsoft Access®) Preferably, data from each of the remote locations is uploaded to the central database via the internet (TCP/IP) so any electronic means capable of uploading data through the internet is acceptable. This could be done by for example:

(1) downloading the radar speed sign data to a PDA, connecting it to a computer with an internet browser, and uploading the data;

(2) connecting the radar speed sign directly to a computer with an internet connection (with appropriate software); and/or (3) connecting the radar speed sign to a wireless communications module capable of TCP/IP (e.g., cellular GPRS, cellular CDMA, 801.11/WiFi). See FIG. 2.

Figure 4:
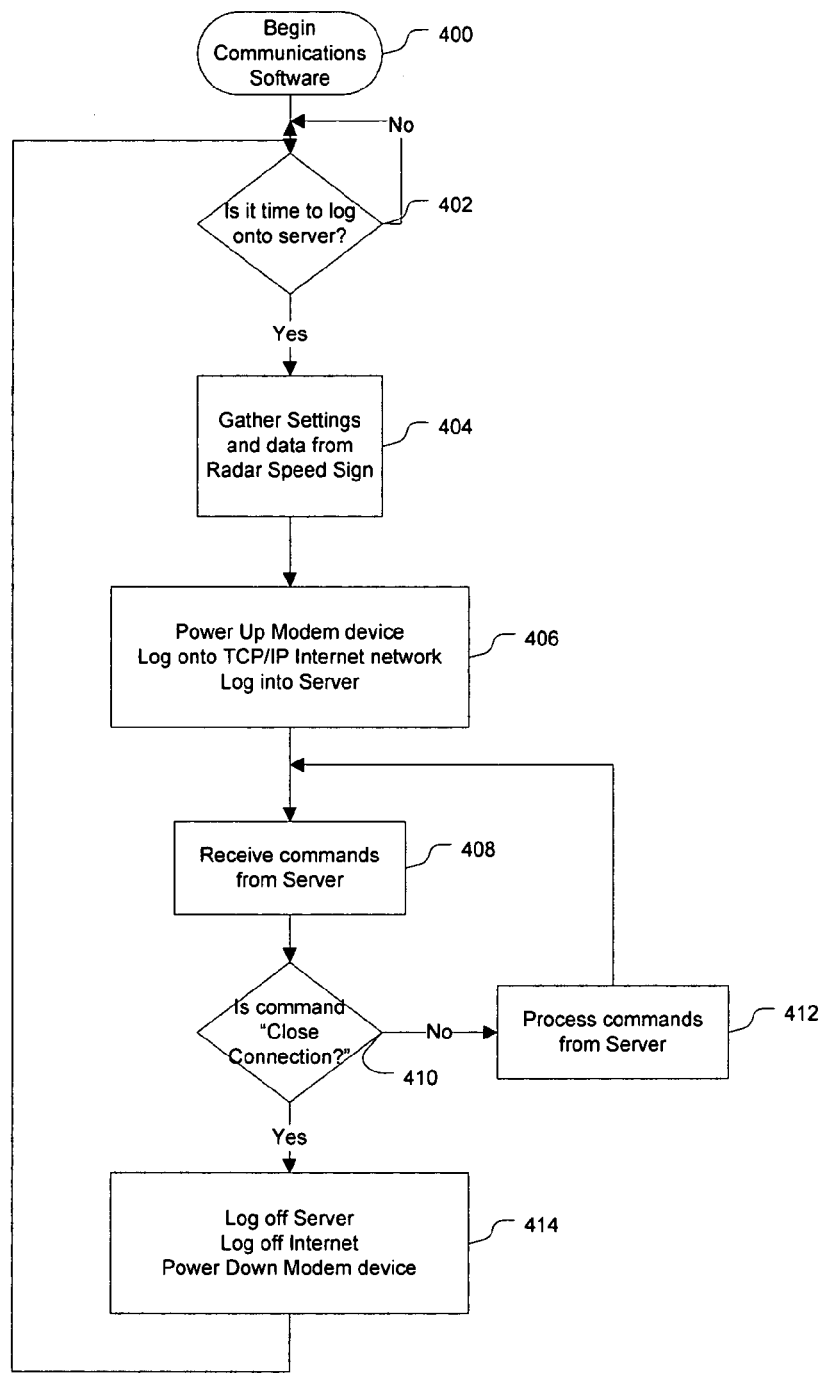
Figure 5:
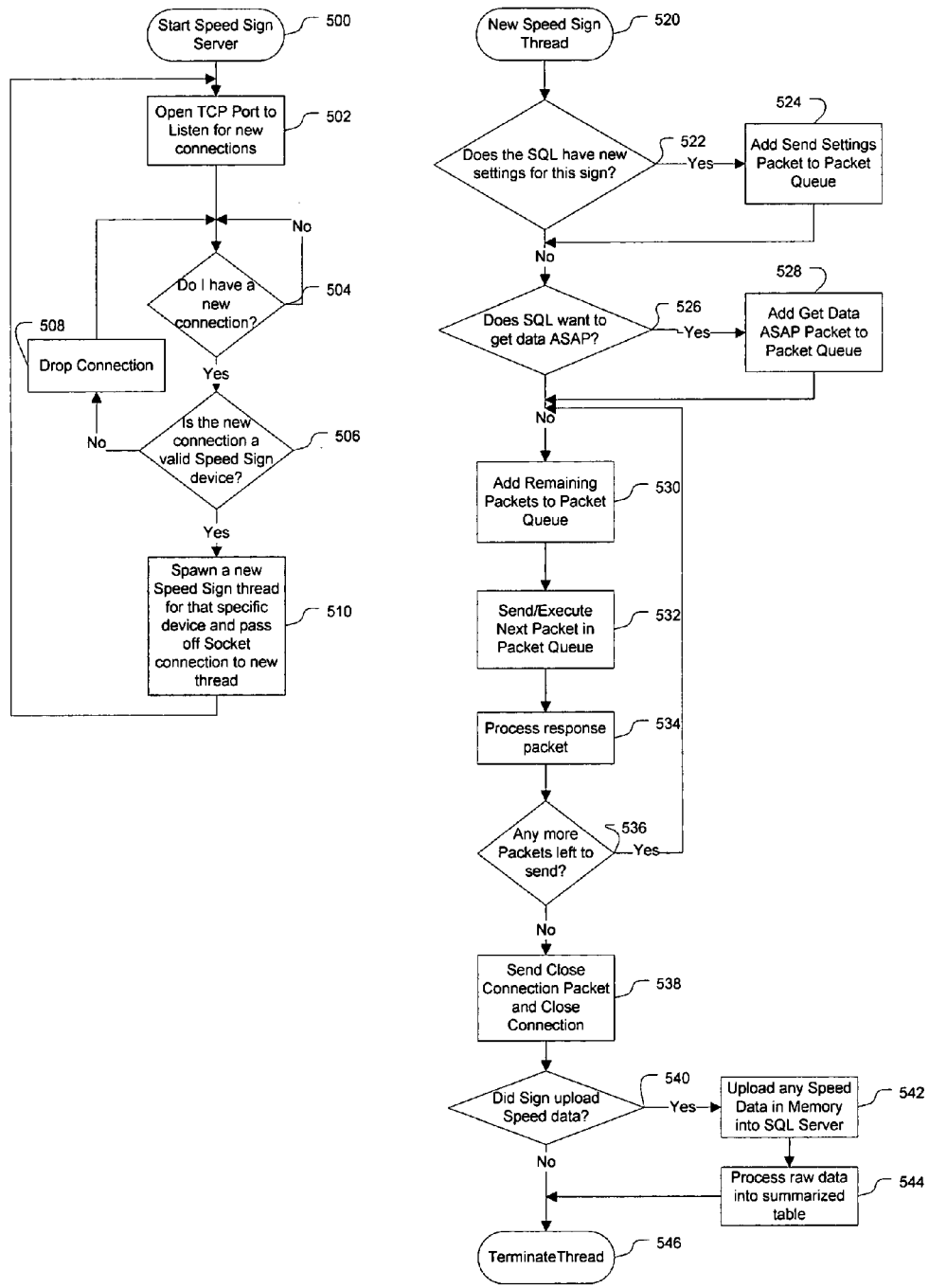
Figure 6A:
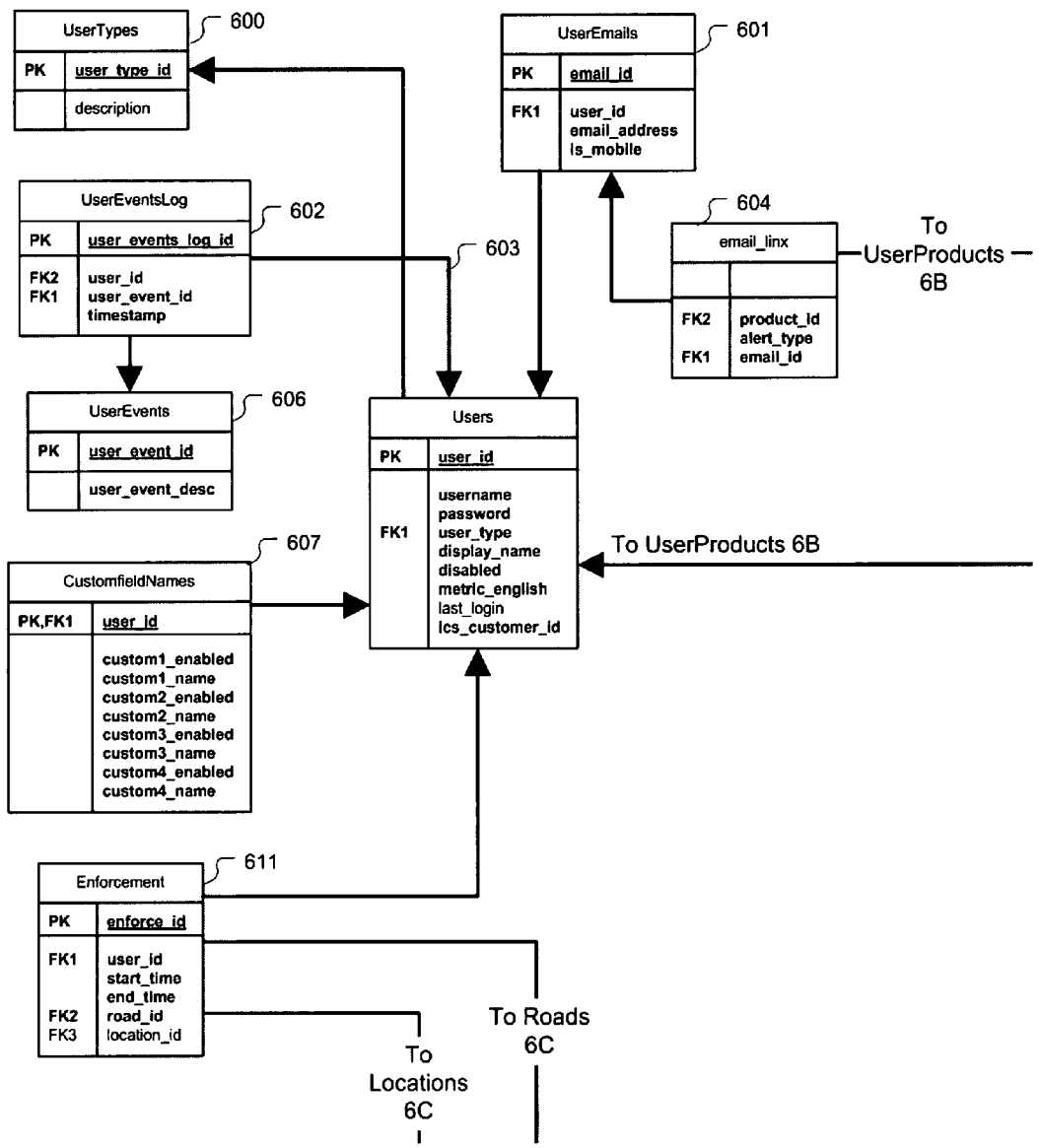
FIGS. 6A-6D, taken together, shows an entity relationship diagram for use with the systems and methods of FIGS. 2-5 in accordance with one preferred embodiment of the present invention.
Figure 6B:
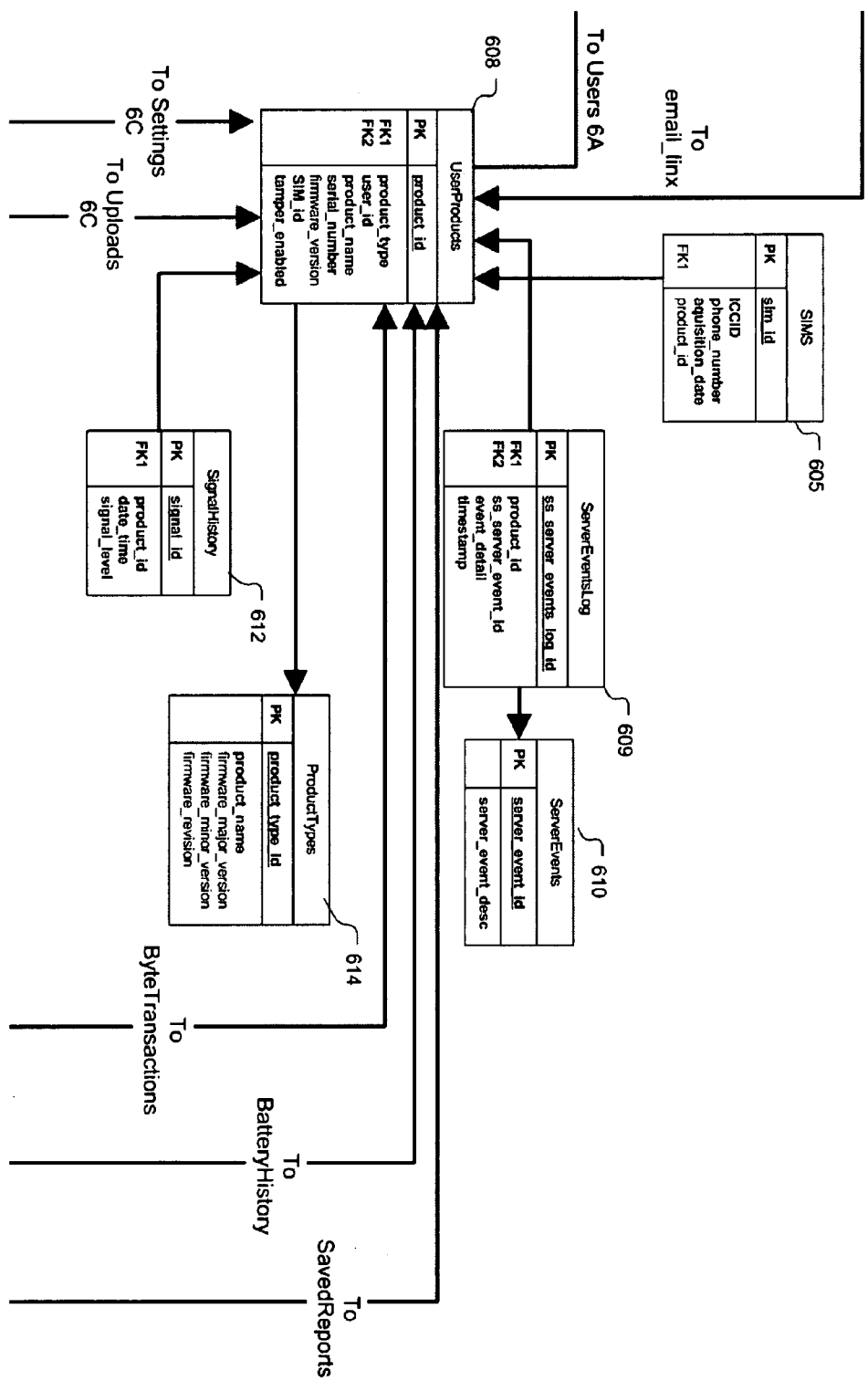
Figure 6C:
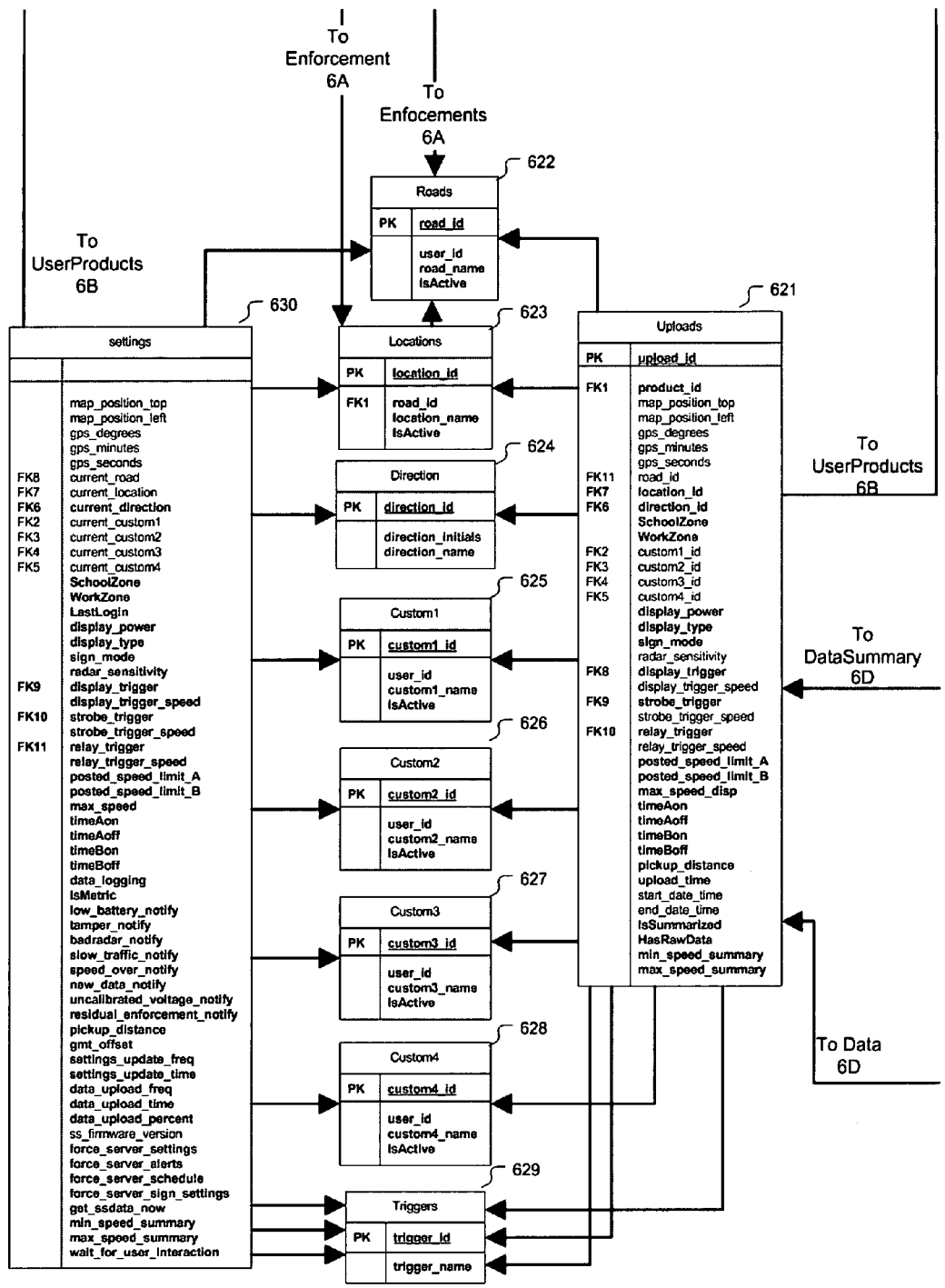
Figure 6D:
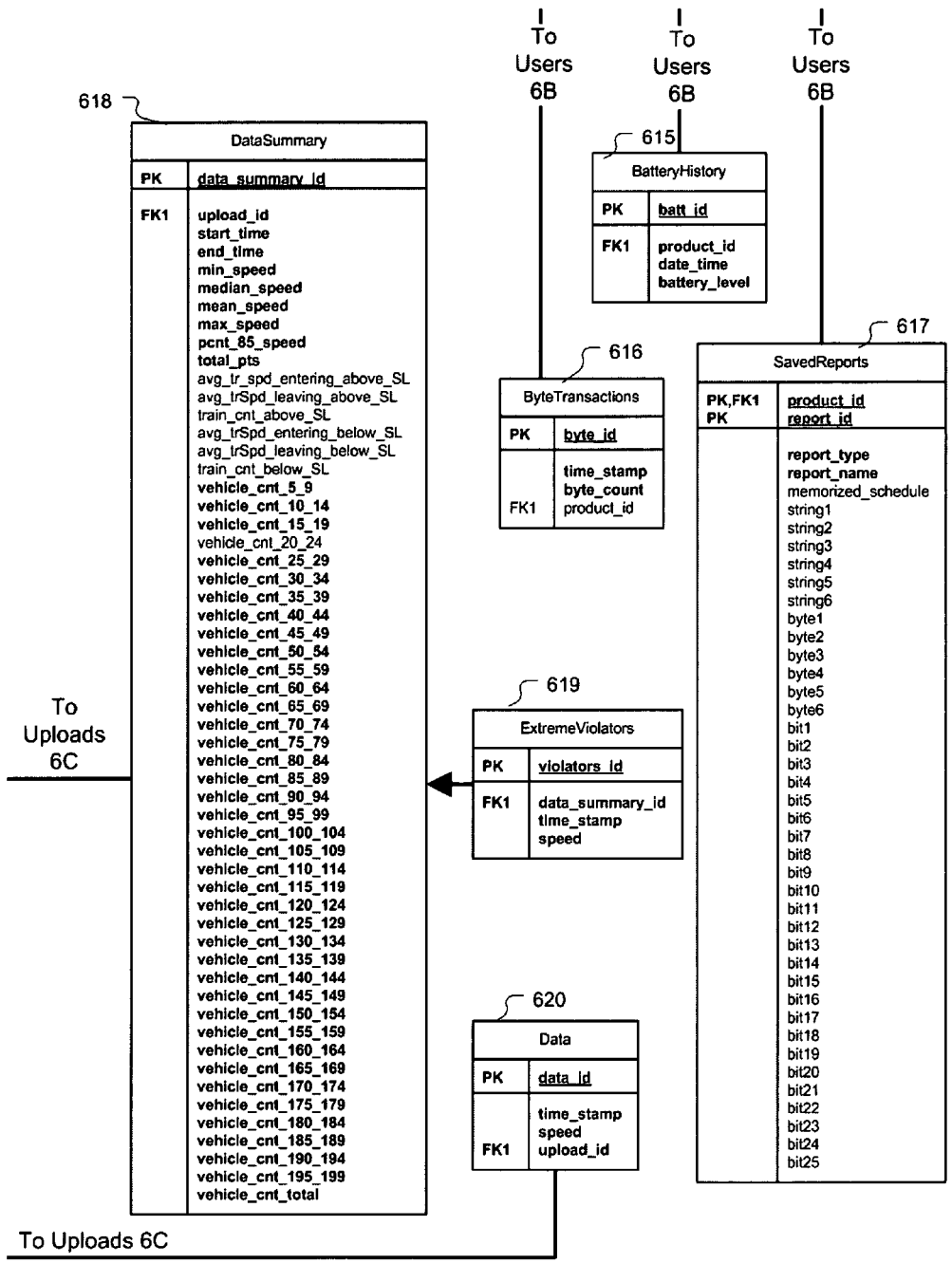

Again the specific data transfer means is not critical as long as the data can be transmitted to a central database. The data could also be loaded directly into the database. Our currently preferred method of transmitting the data is through a cellular service. This service works by having a cellular modem at the data collection device call out on a regular schedule determined by the user and transmit the data to the central server. FIG. 4 shows a flowchart of one preferred communications routine, and FIG. 5 shows the procedures that are used at the speed sign server to connect to the data transmissions and populate the database. The server can be a server maintained by ATS, or it could be the ATS software on a customer's server, or other database software on a server.

In one preferred embodiment, each remote location transmits its data independent of the others. The transmissions could be done in real time as the data is produced. However, in practice, each location is programmed (which can be changed) to submit the data at a frequency (e.g., every 3 hours or once a day). This can save battery power and/or wireless transmission bandwidth and charges compared to transmitting in real time. The transmission is preferably two-way so that the programming or settings/configuration on each device can be updated or changed. Data communications to the devices typically includes settings such as the speed limit, whether the display is on or off, frequency of checking with the server for new settings or data upload, and other standard settings for the device.

D. Database Structure

FIGS. 6A-6D, taken together, shows an entity relationship diagram (ERD) for one preferred implementation of the present invention. The database used to store all of the traffic data, associated settings and all sign parameters is a standard relational database. All database field names and important relationships are described below for further clarification. For security purposes, database table names and fields may have been changed from actual names.

E. Central Database Access/Use

The final step of the process is to provide access to reports from the database(s) to provide useful information (beyond raw data) that a traffic manager or others can use to make informed decisions. Typically, the users would be the customers that have the installed base of devices referred to above. However, additional users may include IT professionals, database managers, other company or governmental personnel, and the general public. There are many useful things that can be done with the data that will provide a traffic manager with more information than the raw data can provide, and the system provides a means for the user to get this report information easily. The data can be sorted, filtered, averaged, maximums and minimums determined, vehicle counts determined, and the like. Additionally, these values can be calculated for any time periods of interest. Some examples will be discussed below in the next section.

In practice, the database is accessed via a web user interface that any number of users (e.g., customers) can have access too. While the central database will contain data from many customers, each customer (via a unique login id) will typically have access to only their own data sources. This is accomplished by a table in the database that associates each user to a specific set of data sources. The users will be able to compare their data to other municipalities, but the specific names will remain confidential.

The primary use of the data for law enforcement customers is to provide enforcement reports. These reports give the officer the ability to select a dataset (e.g., all locations in the municipality for the last 6 months, all school zones for the last two weeks, all 25 MPH roads for the last month, all locations on a specific road, one specific location in a certain timeframe) and generate a report that highlights a certain number (e.g., 10) time periods of highest speeding violations. The time period duration is selectable, for example, 15 minute time windows or one hour time windows, depending on the resolution that the officer desires. The speed ranges are selectable as well. The violations can be the highest percentage over the speed limit or the highest actual number over the speed limit. The report also generates the highest individual speed violations for the data selected, again by actual speed or percentage over the posted speed limit. These times can be reviewed to see if there are patterns for the high speed events and these patterns can be used to identify likely enforcement times or repeat offenders passing the same location on a regular basis.

Figure 35A:
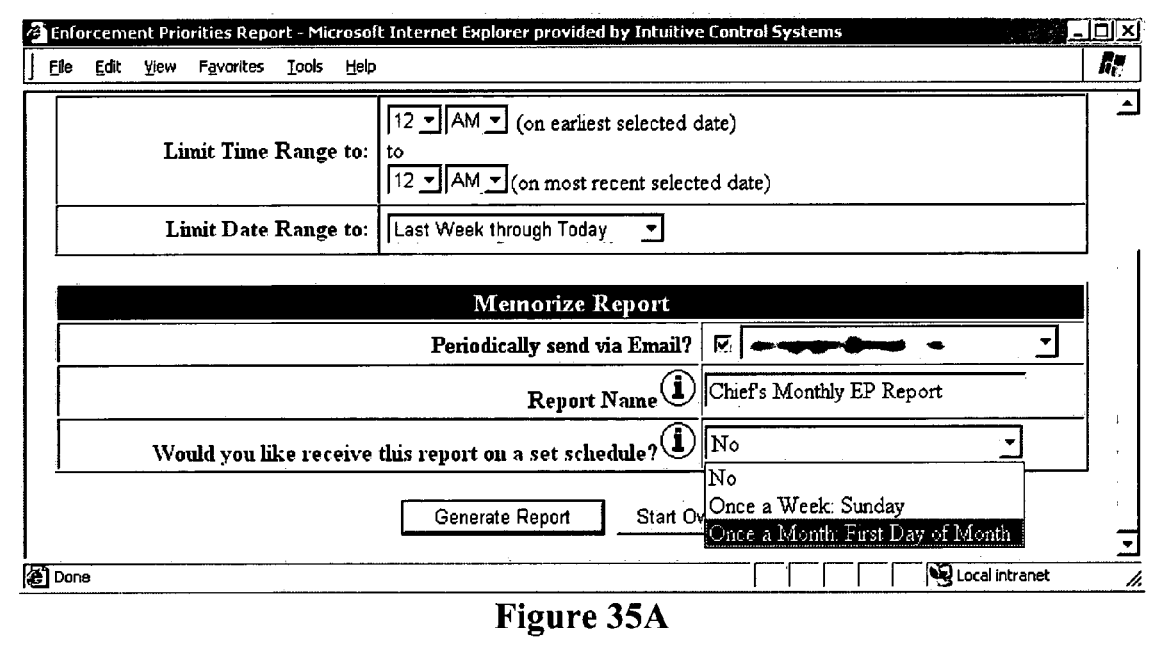
Figure 35B:

Reports can be generated on demand, in response to the occurrence of predefined conditions, or they can be scheduled to be generated and emailed or printed on a periodic schedule. All of the reports in the WebEmpowered system can be set up to be generated automatically (or automatically and periodically), including but not limited to the Summarized Speed Report (FIG. 24), the Speeds and Counts Report (FIGS. 25A and 25B), the Priority Enforcement Report (FIG. 26), or the road report (FIGS. 34A and 34B). For example, the officer can have a report generated monthly for all locations and all data over the last month showing the enforcement priorities and can send this report to himself and to his chief. It can be sent electronically via email or by another electronic source (FIG. 35A). To set the schedule, the user simply chooses the frequency at which the report is required under the "set schedule" option. Reports can also be memorized, where the criteria to generate a report is memorized so it does not have to be filled in each time the same report is needed. These reports can be given an applicable name for identification by the user. These reports are set up in the web page shown in FIG. 35B. This feature will save the user significant time in generating reports.

These municipalities can share data only if they give each other approval to look at each other's data. They can also compare their data to national averages. This feature will allow the user to compare their speed enforcement performance with the performance of other communities in the nation of similar, smaller or larger size, or to compare their performance with a national average. These comparisons are simply selected in the report criteria section (FIG. 36). The selected comparison averages are displayed along with other summary information (FIG. 27). These comparisons could include other information such as road miles, population density, tickets issued, and the like.

Figure 23:

To get a report, the user selects criteria from a criteria selection screen (FIG. 23). The report can include all data in the user's database files, but it can also be narrowed down to certain locations, certain types of roads, certain times, days, and the like. The user can limit the report to these limited criteria using selections on the criteria selection screen which include, but are not limited to, road, locations on the road, type of zone such as a school or work zone, day of the week, certain dates and times, and many other selection criteria that allow the report to be limited to the data in which the user is interested.

The criteria selection screen allows for the generation of customized reports such as the Summarized Speed Report (FIG. 24), Speed Summary (FIG. 25), Count Summary (FIG. 26), or the Priority Enforcement Report (FIG. 27). The reports are not limited to these examples but could include any other reports that a user knowledgeable in this field may want to generate from the accumulated data. The reports display the criteria from which they were generated, for example at the top of the page in these sample reports.

Selecting the report criteria links each criteria with the appropriate data field in which this data is stored (FIGS. 6A-6D).

Figure 30:

Use of the data that is provided by the sensors, unit or location alerts can be provided. The alert criteria or triggers are input on the Alert Criteria Screen (FIG. 30). These alerts constantly compare the current, new data at the sign with the criteria sent to the sign by the user. When the data exceeds the alert limit, the unit will call out to the user and/or other selected parties for email alerts. For example, a high speed alert causes the sign to call out to the user when a vehicle passes the sign at a rate of speed above the speed criteria set by the user. For a congestion alert, the user can specify a speed below which they want to be notified. A low speed can be indicative of an accident, breakdown or other problem that needs to be investigated. Other alarms can be set, including the tamper alert sensitivity or activity of any kind during a set time period indicating an intruder or other suspicious activity. The unit can also send an alert when the battery level has reached the level at which the user requests notification, possibly a value such as 30% power remaining.

The system will also provide an alert when it senses a bad radar sensor in the unit. If the control circuitry in the unit gets either incorrect or corrupt data from the radar unit or no signal for some preset interval in which it is very unlikely that there were no cars, the unit will send a "bad Radar" alarm to the individuals configured to receive this specific alarm. These might be the officer responsible for the unit or the department's or outsourced service personnel. The bad radar alert is similar to other alerts in FIG. 30. Alerts indicating a problem with the unit, such as a bad radar alert or a calibration problem, get emailed automatically to the manufacturer or other selected personnel for resolution.

The alerts and sensor settings are tied to a location in the WebEmpowered System, not to a specific unit. If a sensor is set up in a specific location, the next time the sensor dials in for settings or to download data, the settings saved in the database for this location will be downloaded to the unit. These settings can include the speed limit, radar sensitivity, maximum speed displayed, and all of the other display settings. The alert settings are also tied to the location, not to a specific unit. In most cases, the settings for the high speed alert, low speed alert, tamper alert and others are tied to the location of the unit, not to the unit itself that can be set up in many different locations. In this manner, the user does not have to keep track of which unit is at a specific location. Instead, the user merely keeps track of which locations they will be installing units and the settings for that particular location. If a user has 10 signs, they would not need to know which of the 10 is set up at Main and Elm Streets. The user simply needs to know that a unit is there and what the settings are for any unit at that location.

II. Detailed Disclosure

Figure 1:
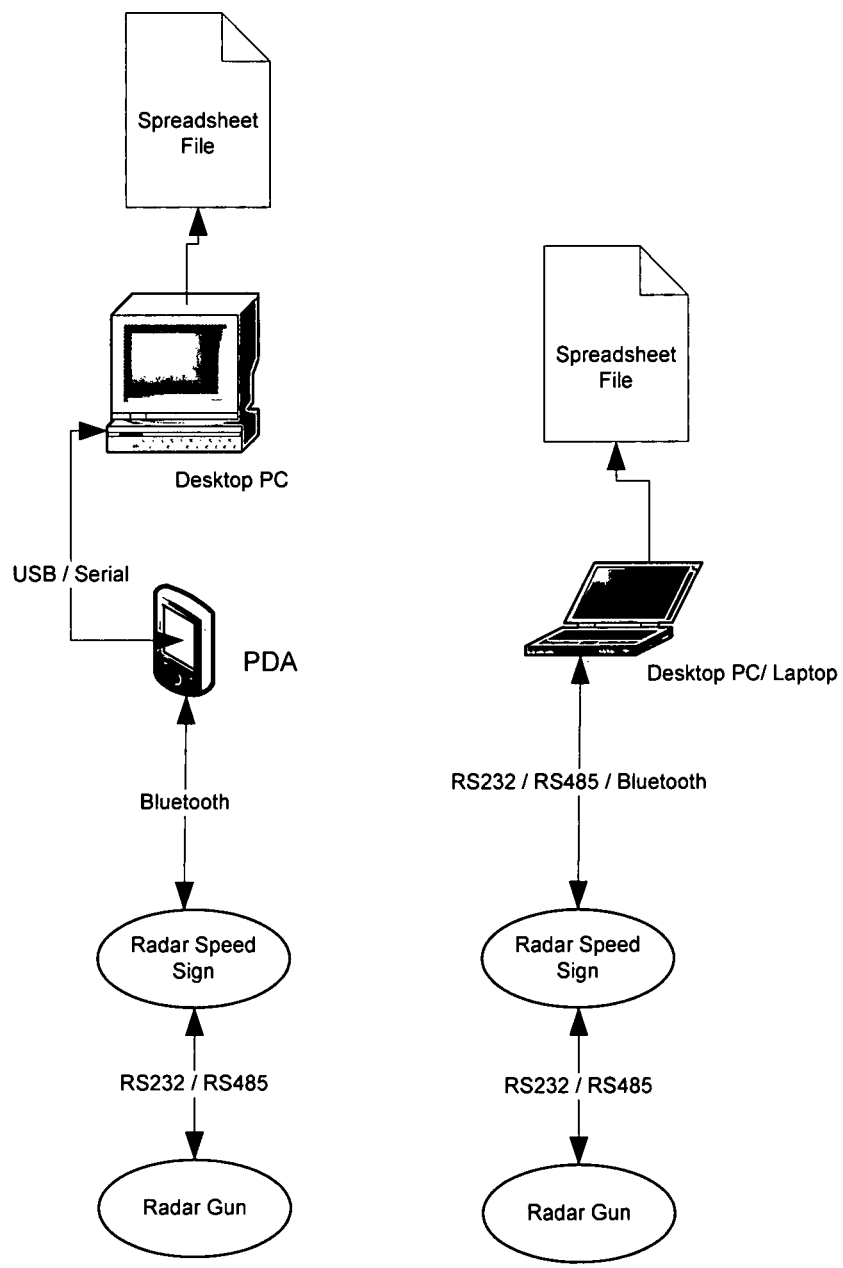
FIG. 1 shows a prior art system and method of capturing data from radar speed signs.

FIG. 1 shows two prior art examples of data flow in a traffic management system. In the first example, data is collected from a radar gun/antenna that is incorporated into a radar speed sign having a memory module (not shown). A PDA is used to download data from the radar speed sign and then is transferred via a USB or serial port to a desktop PC and imported to a spreadsheet file (e.g. Microsoft Excel®) from which a user can manually prepare reports. The second example is similar, but data is downloaded from the radar speed sign directly to a computer via an RS232, RS485 or Bluetooth® connection.

FIG. 2 is an entity relationship diagram of one implementation of the present invention. It shows three different methods of getting collected data from radar speed signs to a web server/SQL database via the internet (TCP/IP). The three alternatives shown are: (1) downloading a radar speed sign data to a PDA and then connecting it to a computer with an internet browser that then transfers the data via TCP/IP to the web server; (2) connecting a radar speed sign directly to a computer (e.g., laptop) with an internet connection and software capable of transferring the data via TCP/IP to the web server; and/or (3) connecting the radar speed sign to a wireless communications module capable of TCP/IP (e.g., cellular GPRS, cellular CDMA, 801.11/WiFi) which will transfer data to the web server. As illustrated in FIG. 2, an SQL database is maintained on the server and data is accessed via any web browser capable of TCP/IP. The web server is interchangeably referred to herein as a host server or web portal.

FIG. 3 shows a representation of a larger scale implementation of the present invention. It shows an installed base of multiple radar speed signs for multiple customers, each in their own separate/independent communities. While FIG. 3 implies a shared TCP/IP connection for many of the radar speed signs, each sign can have an independent TCP/IP connection to the web server/SQL database. FIG. 3 also shows how access to the data can be filtered for each customer so that each customer only sees data from his/her community.

FIG. 4 shows the process for a communications module to interact with the radar speed sign and the server on the other end. This process is implemented on custom hardware utilizing an 8-bit microcontroller, memory, and a cellular modem.

400: Power up module.

402: Once a minute, the module checks to see if it is time for an update or a data upload event based on variables stored in its own EEPROM. If it is not, it goes back to doing nothing. If it is, the process continue.

404: The module transmits packets back and forth between itself and the radar speed sign to gather all of its current settings and a history of settings as they have changed (with timestamps), and, if possible, all of the speed data stored in the speed sign.

406: Once it has all of its data from the speed sign, the module powers on the modem, waits for a cellular signal (much like when a telephone powers on), and finally connects to the internet. Once it its talking over TCP/IP through the internet, it connects to the main server who will control the communications from here out.

408: The server will send a variety of packets of data to the communication module. Here, the module validates each packet to make sure that it was not altered during transmission.

410: If the packet command that was sent was a request to close the connection, the module will initiate shutdown procedures in process 414. Otherwise it processes the packet in process 412.

412: The packet is processed here—packet commands are all requests for data (such as "send all settings," "send all data") and commands to set variables ("apply these settings," "set the clock,") so the module returns the data that was requested of it to the server. See FIG. 5 for more details on how the server software communicates.

414: The server has said to close the connection, so the module logs off the server, shuts down its wireless internet connection and powers off the modem. When this is complete, it returns back to checking to see if it is time for a new update.

FIG. 5:

500: Server Software is loaded.

502: A TCP/IP Socket/Port on the server is opened and set to listen for incoming connections.

504: When a new connection comes in, jump out of a endless loop of listening.

506: The server parses the connection string, and tries to find a match in the database of known, good devices. If a match is found, the program continues in process 510, otherwise, go to process 508.

508: The connection was declared as invalid and the connection is dropped. Start the process over.

510: The connection was declared as a valid device. Pass the socket and related device information off to a new thread that will handle all of the communications from here out.

520: New thread was created for a validated device.

522: If the SQL server has a flag set that the user has updated the settings, add a packet into the packet queue that will send the settings down.

524: Database settings are pulled and converted to a packet to be sent at a later time and added to the packet queue.

526: If the SQL server has a flag set that the user wants to ignore the data upload schedule and instead get data immediately, add a packet into the packet queue that will tell the module to get all of the data when this process is done.

528: Packet is generated and added to the packet queue.

530: The rest of the default packets are added to the packet queue.

532: The Packet queue is now built, so the server starts sending the commands to the module.

534: Every packet sent will get a response. Those responses could be simple "Task completed" notices or they could contain data that was requested. They are processed accordingly.

536: If there still packets left to send, the software jump back to process 532. If there are no more packets left to be sent, the software is done with the bulk of the communication work and is free to continue.

538: Since all communication is done, the server sends a close connection request packet to the communications module, and subsequently closes its socket connection.

540: If the module uploaded speed data, the server needs to take all that data in its memory and put it into SQL. If not, skip to process 546.

542: Data is moved from the server's in-memory collection of speeds and timestamps to rows in a SQL data table for storage.

544: The processing of raw data into useable information is very processor intensive due to the large quantity of data. Because of this, the server does all summarizing of the data as soon as the data arrives at the server and stores the result in a summarized table. Users then have near-instant access to the information they need.

546: Processing is complete, terminate the thread.

FIGS. 6A-6D:

600: UserTypes—Various types of users (Administrator, Demo Users, Standard User)
    user_type_id: Primary key, index
    description: A description of the type of user

601: UserEmails—Acts as an email address pool
    email_id: Primary key, index
    user_id: The user that this email address belongs to—linked to users
    email_address: An email address string.
    is_mobile: A field indicating whether the email address in this row is a mobile device

602: UserEventsLog—Logs actions by the users on the website
    user_events_log_id—Index of the event
    user_id—the user who created the event
    user_event_id—the index of the event that is begin recorded (see UserEvents table)
    timestamp—the date and time (no seconds)

603: Users—List of all the users in the system and some associated information regarding their account
    user_id—A unique ID for the user.
    UserName—login name string
    Password—the account's password string
    user_type—The index of the associated type of the user, see UserTypes
    display_name—A string containing a friendlier name to display within the website
    IsDisabled—A bit flag that determines if the account is active or not
    IsMetric—A bit flag that determines if the account is a metric or English account
    last_login—A timestamp field noting the last login date and time at the website
    ICS_CustomerID—An internal account ID that can associate

604: email_linx—A link table associating a product/device with multiple types of alerts and multiple email addresses
    product_id—The associated product that an alert is for. (See UserProducts)
    alert_type—The type of alert
    email_id—The email address ID associated with the alert (See UserEmails)

605: SIMS—An internal book-keeping list of all cellular SIMs and phone numbers in the system
    SIMid—A unique identifying index.
    ICCID—The SIM's serial number
    phone-number—The phone number associated with the account
    aqusition_date—The date that the ICCID was activated by the cellular carrier.

606: UserEvents—Lists all possible users actions with descriptions
    user_event_id—Unique index
    user_event_description—A string describing the event

607: CustomfieldNames—A table associating user-defined strings with Custom1/2/3/4 to make the system appear more user friendly.

608: UserProducts—A table of all products/devices and associated settings.
    product_id—A unique index
    product_type—the index of the type of product. (See ProductTypes)

user_id—The index of the associated user/account that this device belongs to
product_name—A user customizable string that is used to identify individual devices on the website.
serial_number—The serial number associated with the device
firmware_version—The version of the firmware in the communications module
SIM_id—The ID of the associated SIM in this product
tamper_enabled—A bit flag noting whether they have purchased the tamper alarm feature

609: ServerEventsLog—Logs actions by the server software on the website
server_events_log_id—Index of the event
product_id—The user who created the event
server_event_id—The index of the event that is begin recorded (see ServerEvents table)
event_detail—A string that is used to log event_specific details
timestamp—the date and time (no seconds)

610: ServerEvents—Lists all possible server actions with descriptions
server_event_id—Unique index
server_event_description—A string describing the event

611: Enforcement—A table allowing a list of times and locations where police enforcement was in progress.
Enforcement_id—A unique identifier.
user_id—The associated user/account.
Start_time—The time indicating when the enforcement started
End_time—The time indicating when the enforcement ended
Road_id—The road at which the enforcement took place.
Location_id—The location on the road on which the enforcement took place

612: SignalHistory—An hourly log of the signal quality uploaded by the devices.
signal_id—A unique ID
product_id—The id of the product who's reading this is
date_time—The timestamp of the reading
signal_level—The reading itself

614: ProductTypes—A table of all the possible product types (15" radar sign, 18" radar sign, etc)
product_type_id—A unique ID
product_name—A string representing the title of the product.
firmware_version—The latest firmware version for this product.

615: BatteryHistory—An hourly log of the battery level uploaded by the devices.
battery_id—A unique ID.
product_id—The id of the product who's reading this is.
date_time—The timestamp of the reading.
battery_level—The reading itself.

616: ByteTransactions—A log of the number of bytes transferred via cellular for billing purposes byte_id—A unique ID.
time_stamp—The time the recording of bytes took place.
byte_count—The number of bytes for the session being recorded
product_id—The product that the bytes were transferred to and from.

617: SavedReports—A list of all reports and the settings that the users have set to generate them
report_type—The type of report that the entry is for
report_name—The user's title for the report.
memorized_schedule—The schedule type for the report.

618: DataSummary—A table of processed data ready for display by the user.
data_summary_id—A unique ID
upload_id—The upload that this raw data is associated with.
start_time—The start time for this bin
end_time—The end time for this bin (start time+14 minutes, 59 seconds, 997 milliseconds)
min_speed—The minimum speed detected during this bin.
mean_speed—The average speed calculated for this bin.
median_speed—The 50% median speed calculated for this bin.
max_speed—The maximum speed detected for this bin.
pcnt_85_speed—The 85% speed calculated for this bin.
total_points—The total number of raw speed points used when calculating this bin (for weighting purposes.)
avg_tr_spd_entering_above_SL—The average speed of a train of cars when entering the view of the radar gun when the entering speed is over the speed limit.
avg_tr_spd_leaving_above_SL—The average speed of a train of cars when leaving the view of the radar gun when the entering speed is over the speed limit.
train_cnt_above_SL—A count of the number of trains used to make this calculation.
avg_tr_spd_entering_below_SL—The average speed of a train of cars when entering the view of the radar gun when the entering speed is under the speed limit.
avg_tr_spd_leaving_below_SL—The average speed of a train of cars when leaving the view of the radar gun when the entering speed is below the speed limit.
train_cnt_below_SL—A count of the number of trains used to make this calculation.
vehicle_cnt_total—The number of vehicles detected in the time bin.
vehicle_cnt_##_##—The number of vehicles detected in the time bin for this specified 5 MPH speed bin.

619: ExtremeViolators—A table listing up to three of the top violators in a 15 minute time window
violators_id—A unique ID
data_summary_id—The associated data ID row that the entry is linked to
time_stamp—The time of the speed event
speed—The recorded speed of the event

620: RawData—The raw speed data pulled from the radar gun
data_id—A unique ID.
time_stamp—The time (with milliseconds) of the speed reading.
speed—The speed detected by the radar gun
upload_id—The upload that this data is associated with.

621: Uploads
product_id—The associated product that this dataset was uploaded by.
map_position_top—The Y coordinate noting where on the current map the device was.
map_position_left—The X coordinate noting where on the current map the device was.
gps_degrees—The degrees reading from the GPS device for this upload.
gps_minutes—The minutes reading from the GPS device for this upload.
gps_seconds—The seconds reading from the GPS device for this upload.
road_id—The road associated with this upload.
location_id—The location associated with this upload.
direction_id—The direction associated with this upload.

custom1_id—The custom1 field associated with this upload.
custom2_id—The custom2 field associated with this upload.
custom3_id—The custom3 field associated with this upload.
custom4_id—The custom4 field associated with this upload.
SchoolZone—A bit flag noting whether the device is in a school zone
WorkZone—A bit flag noting whether the device is in a work zone
display_type—The device's display type with this data.
sign_mode—The device's sign mode with this data.
radar_sensitivity—The device's radar sensitivity with this data.
display_trigger—The device's display trigger with this data. (See Triggers table)
display_trigger_speed—The device's display trigger speed with this data.
strobe_trigger—The device's strobe trigger with this data. (See Triggers table)
strobe_trigger_speed—The device's strobe trigger speed with this data.
relay_trigger—The device's relay trigger with this data. (See Triggers table)
relay_trigger_speed—The device's relay trigger speed with this data.
speed_limit—The device's speed limit with this data.
reduced_speed_limit—The device's reduced speed limit with this data.
max_speed_displayed—The device's maximum speed displayed with this data.
timeAon—The device's Time window A on time with this data.
TimeAoff—The device's Time window A off time with this data.
TimeBon—The device's Time window B on time with this data.
TimeBoff—The device's Time window B off time with this data.
pickup_distance—The device's manually entered pickup distance estimate with this data.
upload_time—The time this upload took place.
IsSummarized—A bit flag that notes whether the raw data for this upload has been summarized.
HasRawData—A bit flag that notes whether the raw data for this upload still exists in the database.
min_speed_summary—The speed at which all data below the value was ignored when calculating the summary.
max_speed_summary—The speed at which all data above the value was ignored when calculating the summary.

622: Roads—A table containing all roads used by all accounts.
road_id—A unique ID.
road_name—A string containing the road's name
user_id—The associated account for the road described.
IsActive—This marks whether the user has disabled the road (for display purposes.)

623: Locations—A table containing all locations use by all accounts.
location_id—A unique ID.
road_id—The ID of the road that this location is on.
location_name—A string containing the road's name
IsActive—This marks whether the user has disabled the road (for display purposes.)

624: Directions—A table listing the 4 possible directions a road could have
direction_id—A unique ID.
direction_initials—The initials of the directions (NB—North Bound)
direction_name—A string containing a show description of the direction (North Bound)

625: Custom1—A table containing all custom1 fields used by all accounts.
custom1_id—A unique ID.
custom1_name—A string containing the custom 1 field's name
user_id—The associated account for the custom 1 field described.
IsActive—This marks whether the user has disabled the custom 1 field (for display purposes.)

626: Custom2—A table containing all custom1 fields used by all accounts.
custom2_id—A unique ID.
custom2_name—A string containing the custom 2 field's name
user_id—The associated account for the custom 2 field described.
IsActive—This marks whether the user has disabled the custom 2 field (for display purposes.)

627: Custom3—A table containing all custom1 fields used by all accounts.
custom3_id—A unique ID.
custom3_name—A string containing the custom 3 field's name
user_id—The associated account for the custom 3 field described.
IsActive—This marks whether the user has disabled the custom 3 field (for display purposes.)

628: Custom4—A table containing all custom1 fields used by all accounts.
custom4_id—A unique ID.
custom4_name—A string containing the custom 4 field's name
user_id—The associated account for the custom 4 field described.
IsActive—This marks whether the user has disabled the custom 4 field (for display purposes.)

629: Triggers—A table containing the possible speed triggers for the sign
trigger_id—A unique ID.
trigger_desc—A description of the trigger (All Vehicles, Speed Limit, None, etc.)

630: Settings—A table containing all of the settings for all devices.
product_id—The associated product that this dataset was uploaded by.
map_position_top—The Y coordinate noting where on the current map the device was.
map_position_left—The X coordinate noting where on the current map the device was.
gps_degrees—The degrees reading from the GPS device for this upload.
gps_minutes—The minutes reading from the GPS device for this upload.
gps_seconds—The seconds reading from the GPS device for this upload.
current_road—The road associated with this upload.
current_location—The location associated with this upload.
current_direction—The direction associated with this upload.

current_custom1—The custom1 field associated with this upload.
current_custom2—The custom2 field associated with this upload.
current_custom3—The custom3 field associated with this upload.
current_custom4—The custom4 field associated with this upload.
SchoolZone—A bit flag noting whether the device is in a school zone
WorkZone—A bit flag noting whether the device is in a work zone
LastLogin—A timestamp of when the sign last logged into the server.
display_type—The device's display type with this data.
sign_mode—The device's sign mode with this data.
radar_sensitivity—The device's radar sensitivity with this data.
display_trigger—The device's display trigger with this data. (See Triggers table)
display_trigger_speed—The device's display trigger speed with this data.
strobe_trigger—The device's strobe trigger with this data. (See Triggers table)
strobe_trigger_speed—The device's strobe trigger speed with this data.
relay_trigger—The device's relay trigger with this data. (See Triggers table)
relay_trigger_speed—The device's relay trigger speed with this data.
speed_limit—The device's speed limit with this data.
reduced_speed_limit—The device's reduced speed limit with this data.
max_speed_displayed—The device's maximum speed displayed with this data.
TimeAon—The device's Time window A on time with this data.
TimeAoff—The device's Time window A off time with this data.
TimeBon—The device's Time window B on time with this data.
TimeBoff—The device's Time window B off time with this data.
pickup distance—The device's manually entered pickup distance estimate with this data.
IsMetric—A bit flag noting whether this device is a metric unit.
low_battery_notify—A number representing the percentage at which the device will auto-notify the user when the battery hits that voltage.
tamper_notify—A sensitivity at which the device will notify the user when it detects vibrations on the sign.
bad_radar_notify—A back end alert enable bit that allows ATS to be notified if the radar gun appears to have gone bad.
slow_traffic_notify—A speed at which the device must detect to send a slow traffic alert.
speed_over_notify—A speed at which the device must detect to send a speeder alert.
new_data_notify—A bit flag noting whether the user wants to be notified of new data being uploaded into the system.
uncalibrated_voltage_notify—A back end alert enable bit that allows ATS to be notified if the sign has not had its battery voltage correctly calibrated.
gmt_offset—A value that allows the server to know what time zone the device is in to send the correct time to.
settings_update_freq—A frequency (in hours) at which the sign will get online to checks settings.
settings_update_time—A time for doing the first settings update.
data_upload_freq—A frequency (in days) at which the sign will get online and upload data.
data_upload_time—A time within the day to do the data upload
data_upload_percent—A data percent full value at which the sign will ignore its schedule and upload data.
ss_firmware_version—The firmware version on the device.
force_server_alerts—A bit flag noting to the system that the user has change alerts.
force_server_schedule—A bit flag noting to the system that the user has changed the scheduling.
force_server_sign_settings—A bit flag noting to the system that the user has changed the sign settings.
min_speed_summary—The speed to use at which all data below the value will be ignored when calculating the summary.
max_speed_summary—The speed to use at which all data above the value will be ignored when calculating the summary.

Figure 7:
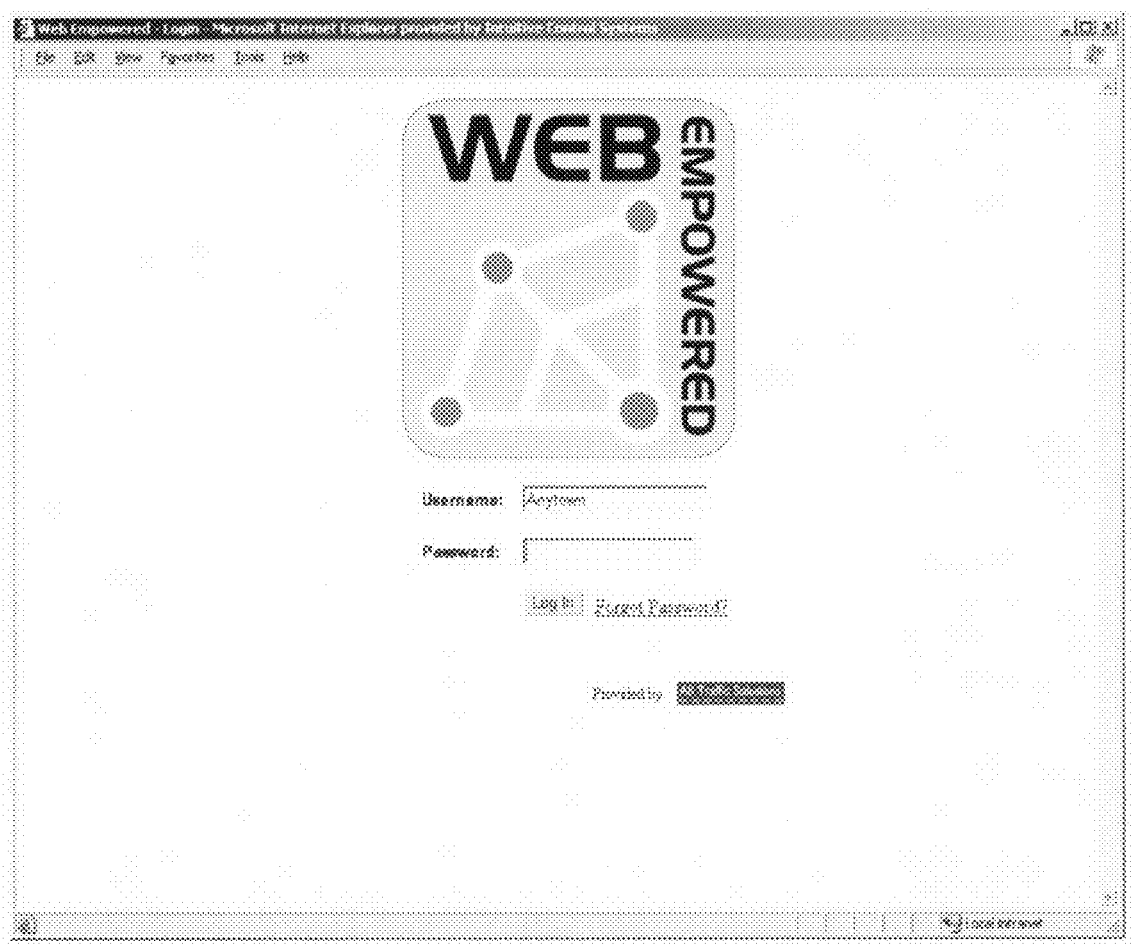

Software Screen Shots and Discussion of the Functions:

FIG. 7: The WebEmpowered introduction screen allows for a password-protected sign in. The system compares the user name and the password in the users table and allows entry if name and password agree with data in the file.

Figure 8:
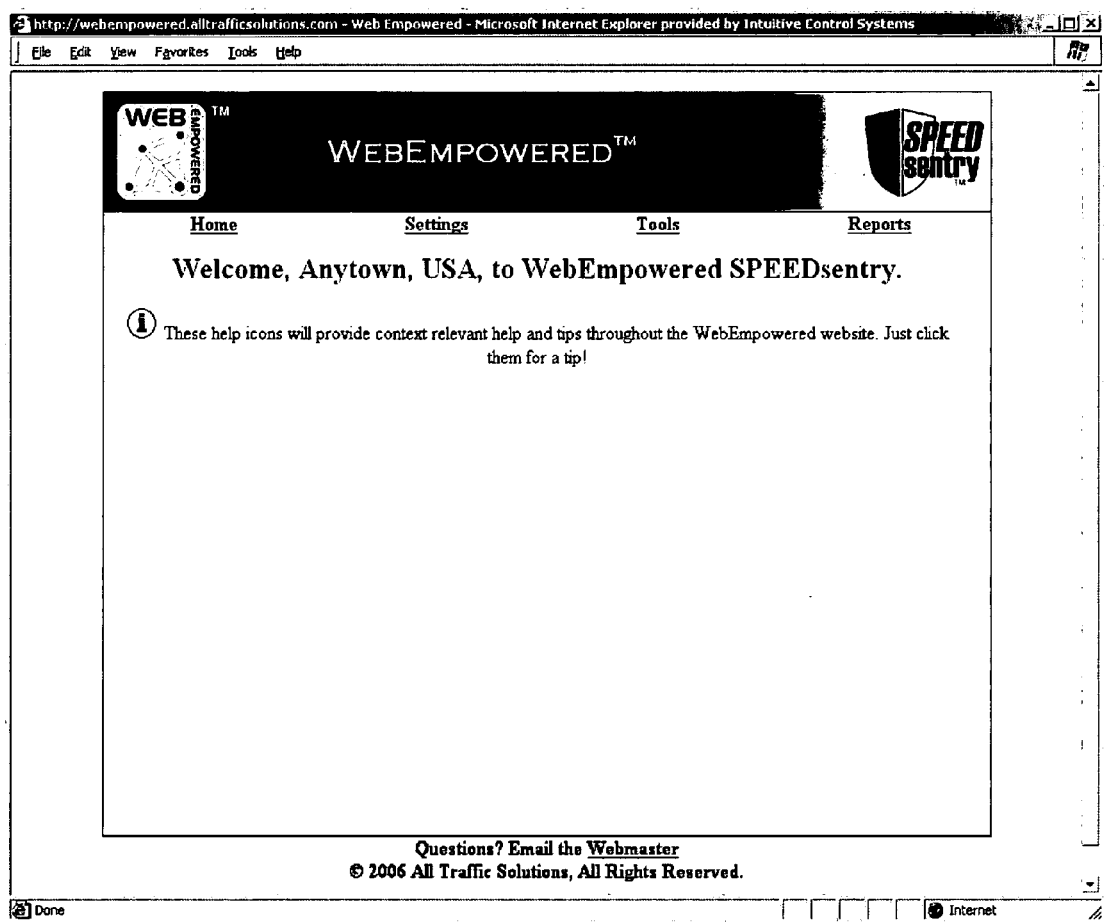

FIG. 8: The welcome screen acknowledges an allowed user's entry into the system and provides the navigation options of home, settings, tools and reports.

Figure 9A:
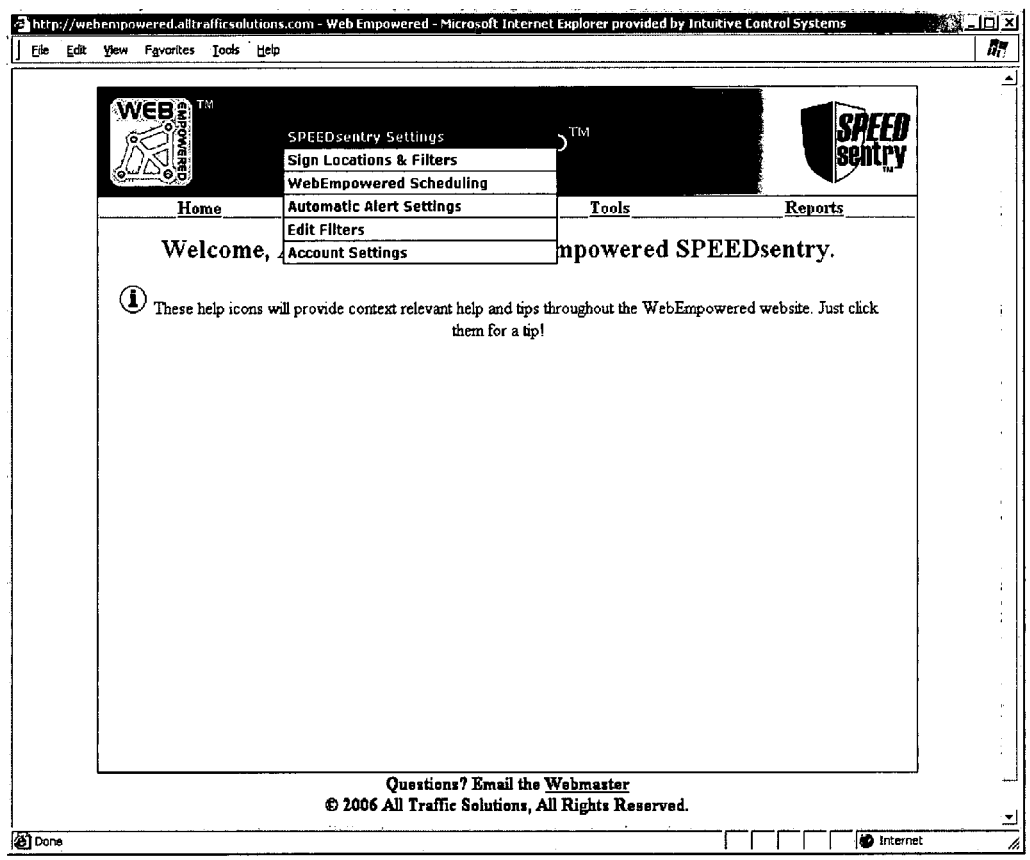

FIG. 9A: In the Settings Menu, the user can choose to review the current setup of speed display units including an individual unit's location and data labels, scheduled settings such as data upload times, automated alert settings for significant events; and review the general account settings.

Figure 9B:
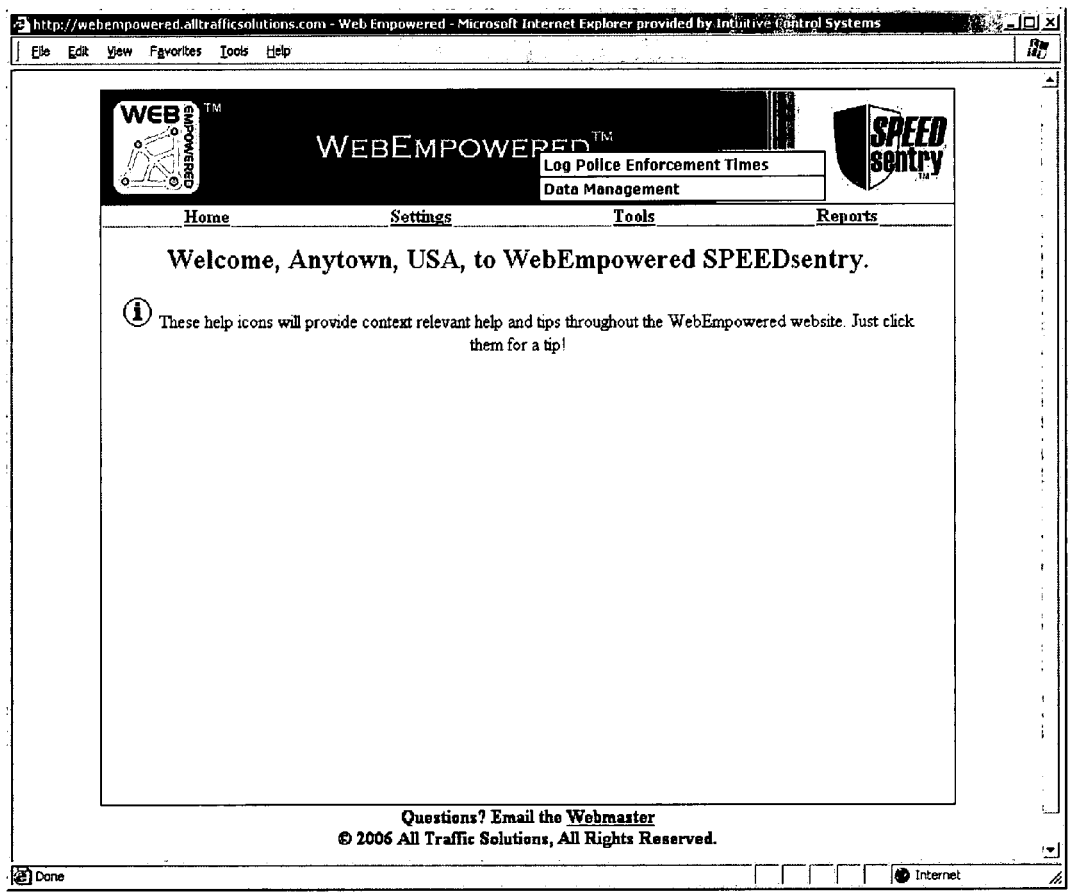
Figure 31:
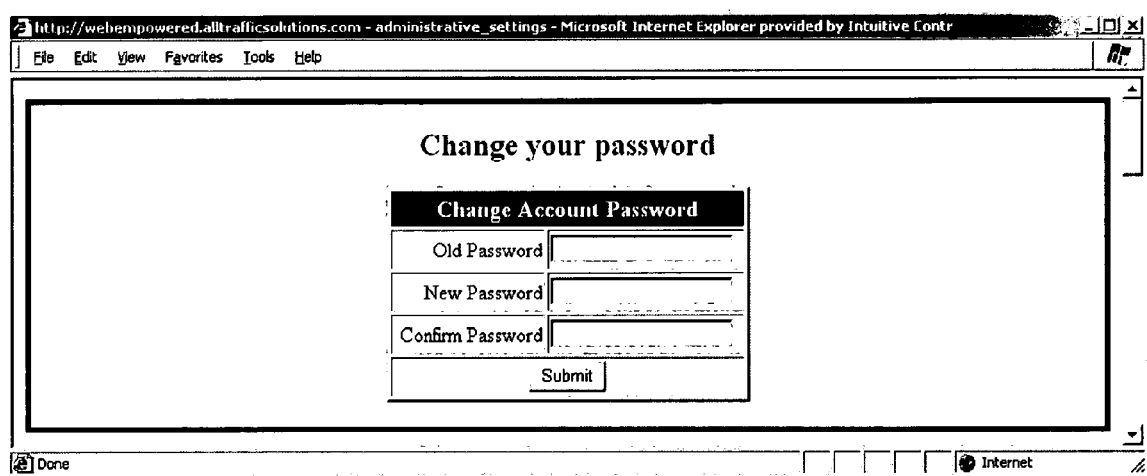
Figure 32:
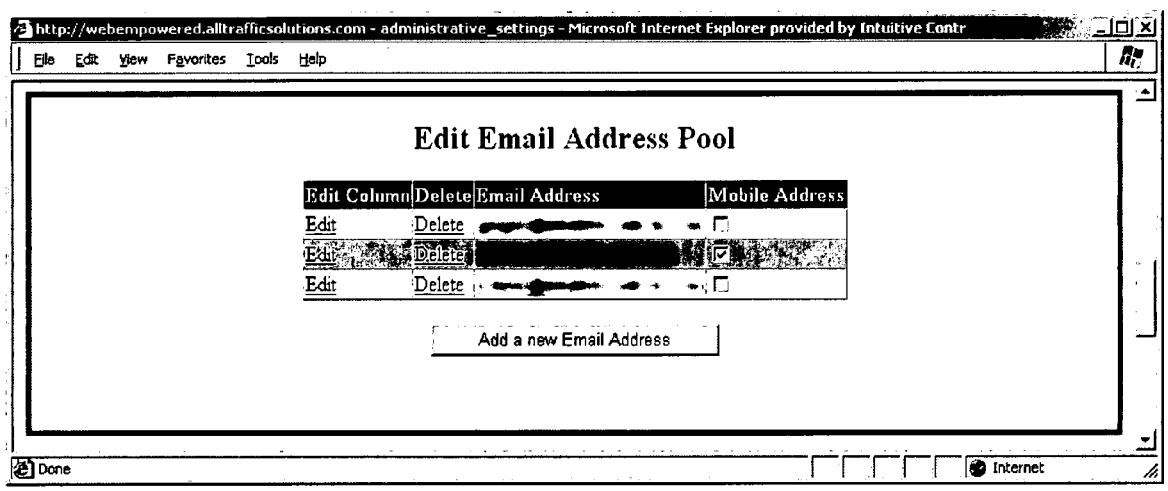
Figure 33:
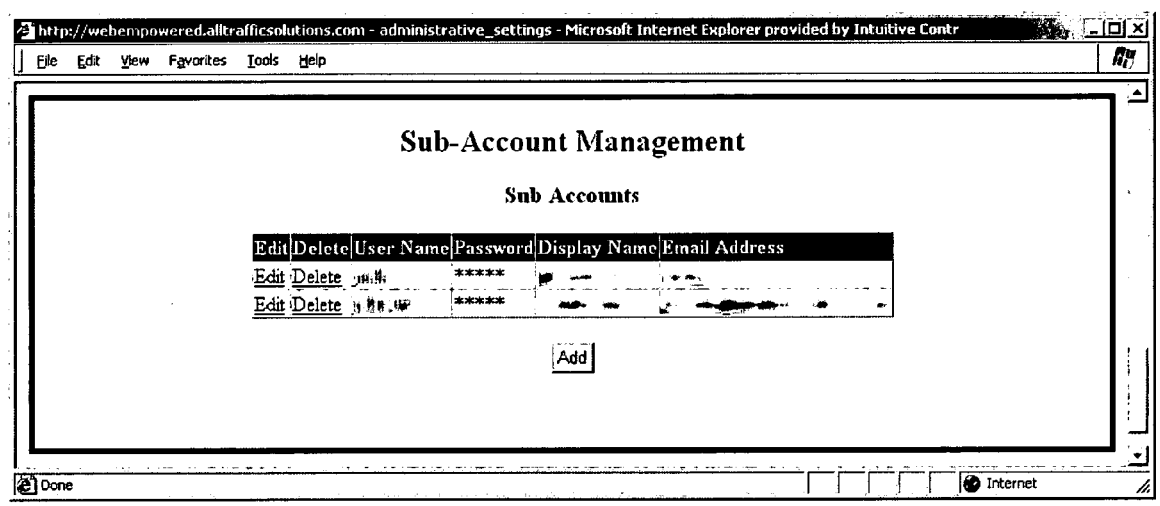

FIG. 9B: In the Tools Menu the user accesses the enforcement times entry tool to enter on-site enforcement times and locations for overlay in enforcement charts (FIG. 16), and the data management tool which provides a means for reviewing and editing data name fields for all the data in the system (FIGS. 31-33).

Figure 10:
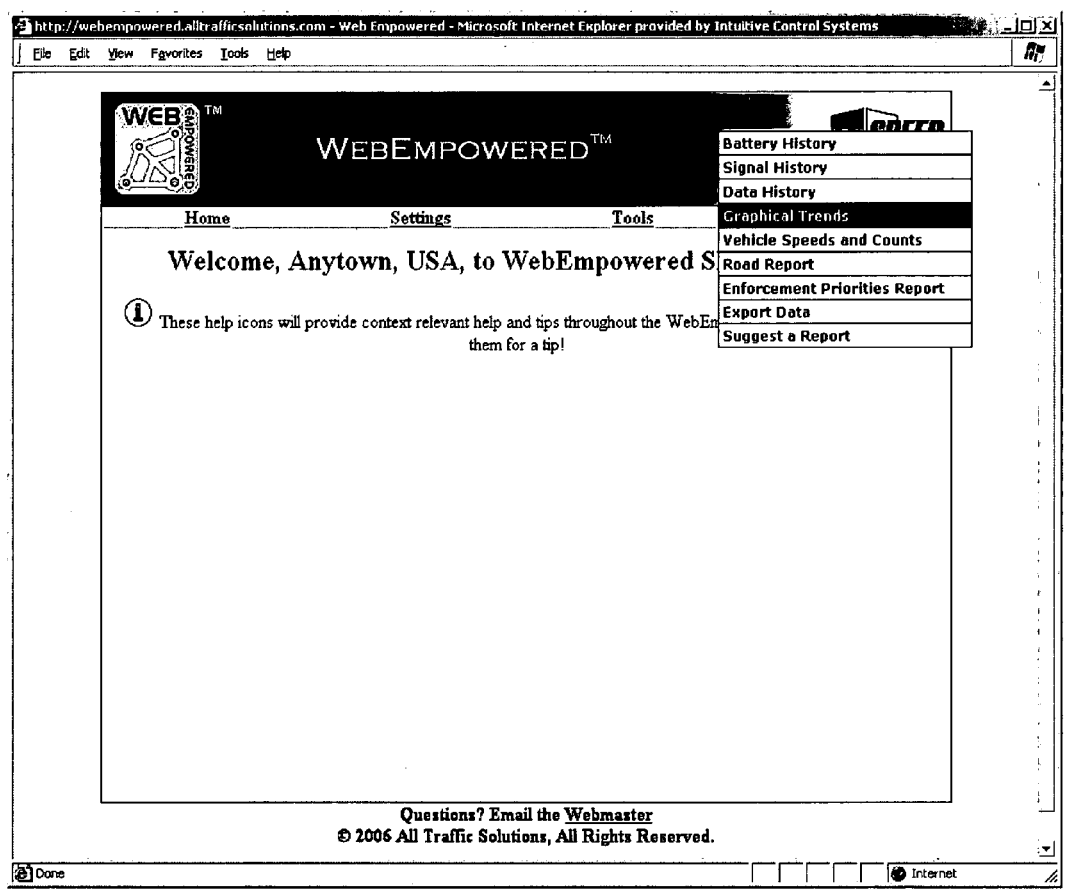

FIG. 10: The Reports Menu lets the user navigate to screens for generating many reports which are all described below. The screens all generally ask for a data range over which to generate the report and then provide a custom report. The data range includes the time and dates, as well as the data label ranges. For most reports, the data is independent of the sensor unit, as they all provide raw data for use in generating the reports which are generally comparative in nature. Some reports are dependent on the unit, such as the battery history report and the signal history report. The "Suggest a Report" screen allows the user to contact ATS with suggestions for future reports that can be generated from the data on the system.

FIG. 11: The SPEEDsentry Sign Settings Screen provides a summary of the settings on all of the current speed display sensors in a customer's sensor network. It includes information including location, unit name, time of last login to the WebEmpowered system, display mode, sign/radar sensor mode, posted speed limit, display trigger speed or condition, strobe trigger speed or condition, relay trigger speed or condition, data logging status and radar unit settings. This data is current as of the last time the unit logged into the system. The screen will also keep track of both the current sign settings and the pending settings that will take effect upon the sign's next contact with the server.

FIG. 12: The WebEmpowered Scheduling Screen allows the user to schedule communication events with each of the sensors that they are maintaining. The screen lists all available units under control and their current location provided by the user. The user enables the data upload and schedules the approximate time of the upload. The system uploads the data as near as possible to this time, depending on the schedule of all uploads required and the main system loading. The user also schedules how often they want the sign to call into the server for setting updates, which allow the sign to receive new setting information. Frequent setting updates might be used in a school zone where they want the sign to operate differently depending on the current event schedule at the school. The scheduled calls are an important feature of the design, as the power required to keep the sign on-line all of the time awaiting a call would make operation from a self-contained battery impractical. The solution is for the sign to power up the modem and call in to the server on these scheduled events.

FIG. 13: The SPEEDsentry Filters and Associations Screen lets the user review the current data label settings for each speed display sensor unit in the field at the time of the last data upload. This summary can help the user maintain consistency in their data labeling process. It also allows the user to edit the location and put in a future or past location, so the data will automatically be split between the old and the new location upon the next data upload. The user can schedule this move either before or after the actual move. It just has to be entered before the next scheduled data upload to take effect. After the scheduled data upload, a data file can be split between two locations in the Traffic Data Management screen.

Figure 14:

FIG. 14: The WebEmpowered Data Filter Screen allows the user to set up the fields to be used to label each uploaded data set. They get to select whether they want to use the four custom fields in addition to the standard data name fields—Traffic Study, Roads and Locations, and the conditional fields—direction, school zone, work zone, enforcement presence, day(s) of the week, direction and speed display on or off. If they choose to use the custom fields, they get to name the custom fields they select so these will get uniform input names as they are used in the process of data uploading. In this example, these are the season study and the event type for the two selected custom fields. To keep the system and interface as simple and as clear as possible, the system will keep these fields hidden if the customer does not want to use them. This screen allows the user to review all of the labels in each data field for consistency relating to the name of the field and to the appropriateness of the desired studies and reports to be generated. The names can be edited in this section to simplify and keep the report generation process easy and relevant.

Figure 15:
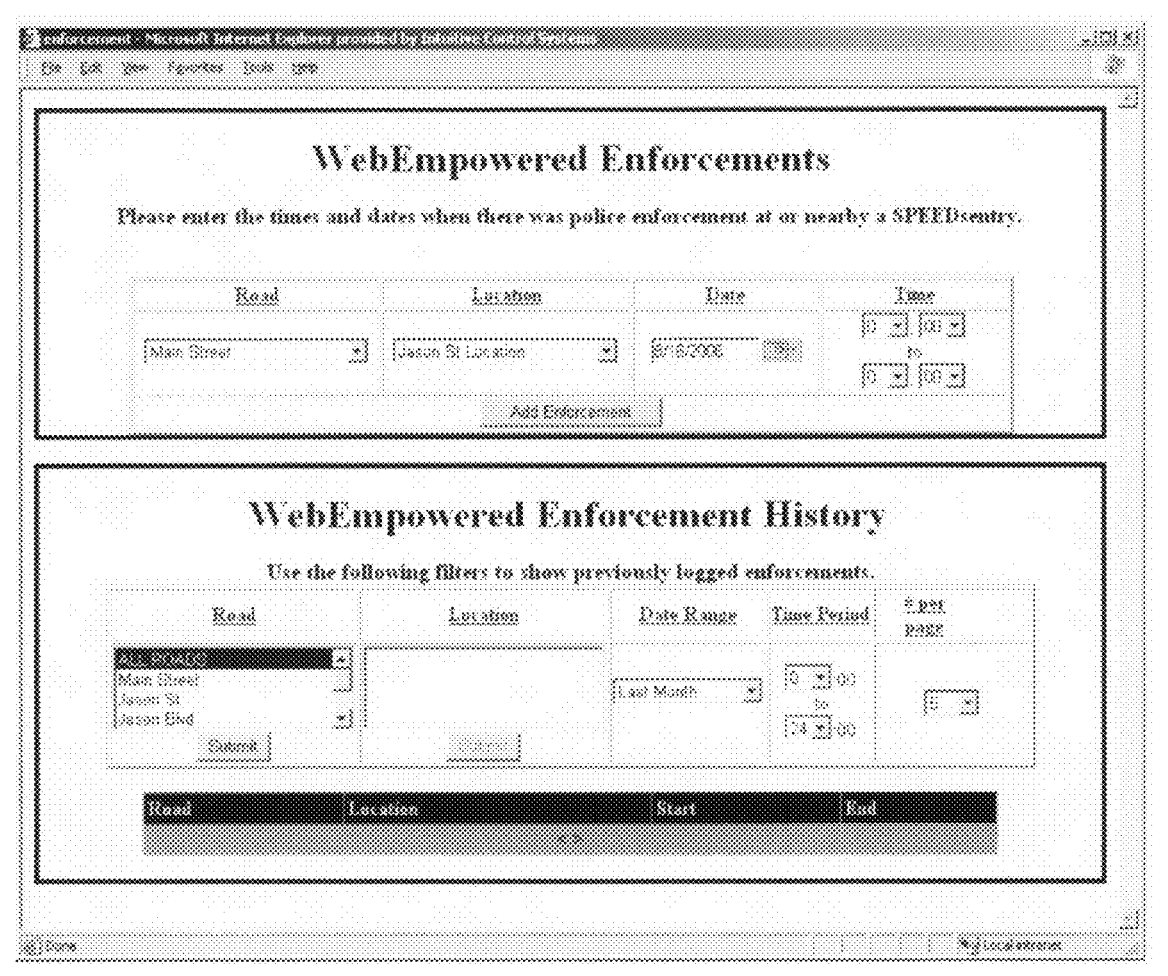

FIG. 15: The WebEmpowered Enforcements entry screen and history screens allow the traffic officer or user to enter new enforcement activity times and locations and review past enforcement and times locations. This data is used in the enforcement vs. speed overlay chart. The user can log police vehicle enforcement times (speed traps) that allow for overlay of the actual enforcement times over the graph of the speed data.

Figure 16:
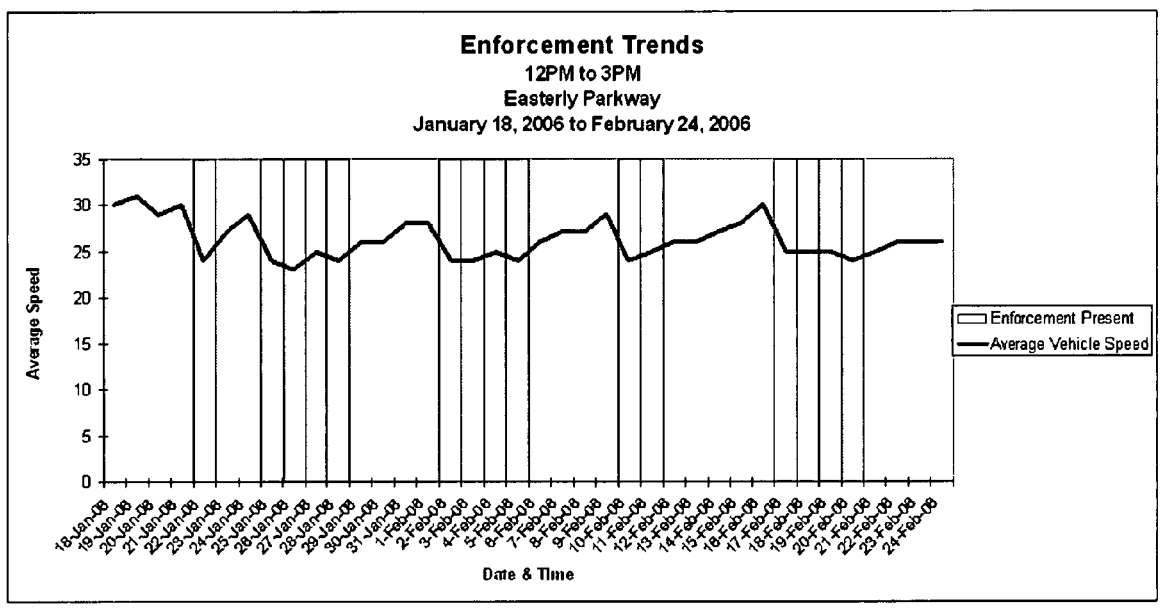

FIG. 16: This overlay is used to show the rise in average speed after police on-site speed enforcement ends, and is an important feature of the invention. Using this chart, the user or traffic officer can see when the enforcement effectiveness of having a manned police vehicle enforcing the speed limit has decayed and the average speeds have gone back up to non-enforced levels. Only then do they enforce to utilize the enforcement resources effectively, rather than enforcing using seat-of-the-pants instinct. To do this, a speed sensor is placed in the proximity of an enforcement location and records speed data both when the police car is on site and when it isn't. Then, the speeds when no police car is present can be reviewed against the speeds with the police car's presence to see the effect of the police enforcement activity on the speeds. Once the police car goes away, some locations may take longer for the average speed to creep back up to normal and others may have the average speed increase more quickly. This chart provides a visual display of this situation and provides a systematic method for determining enforcement locations and timing in place of conventional "seat-of-the-pants" enforcement planning. The system can be programmed to provide an alert when the average speed has risen a set amount over, or is a multiple of a selected speed so the user is automatically alerted to the need for on-site police enforcement.

Figure 17:
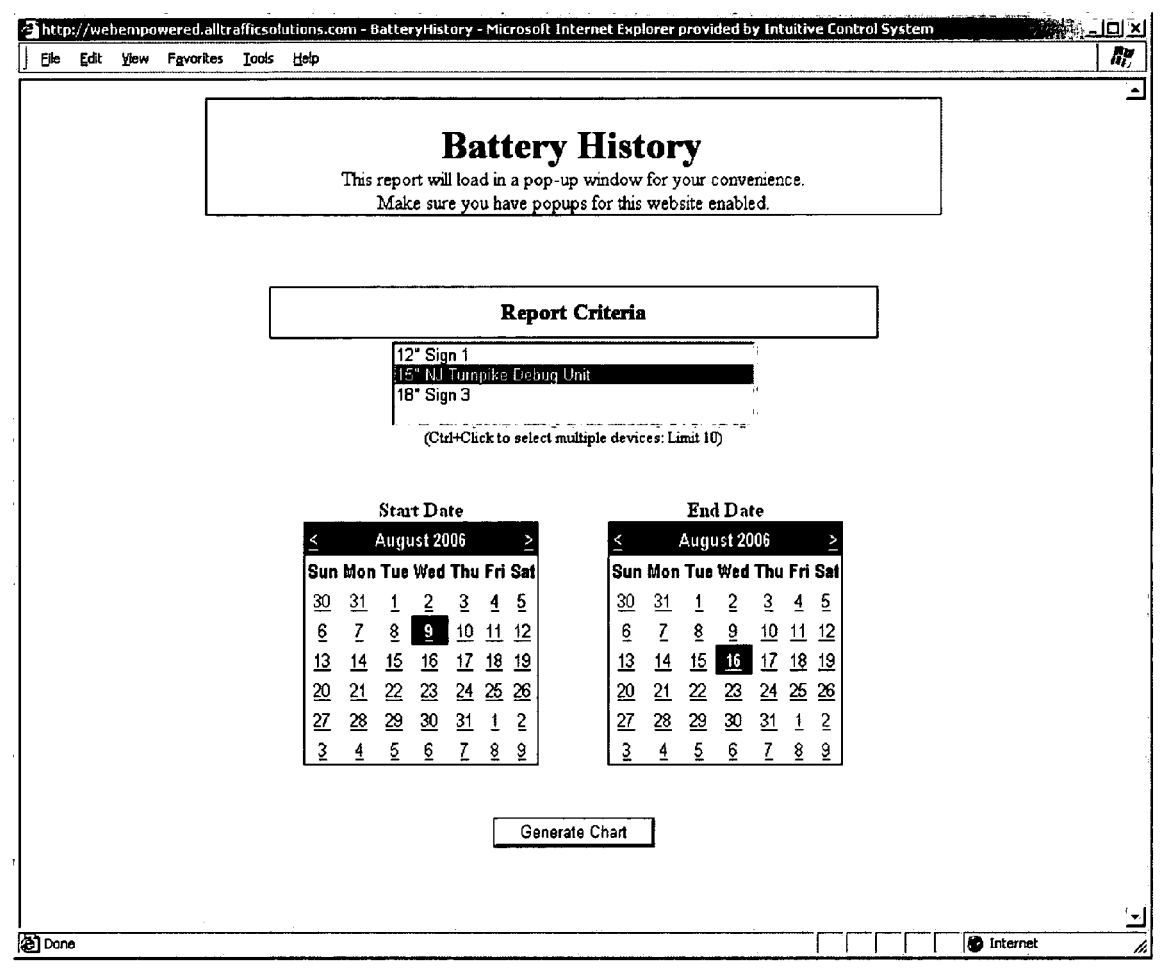
Figure 18:
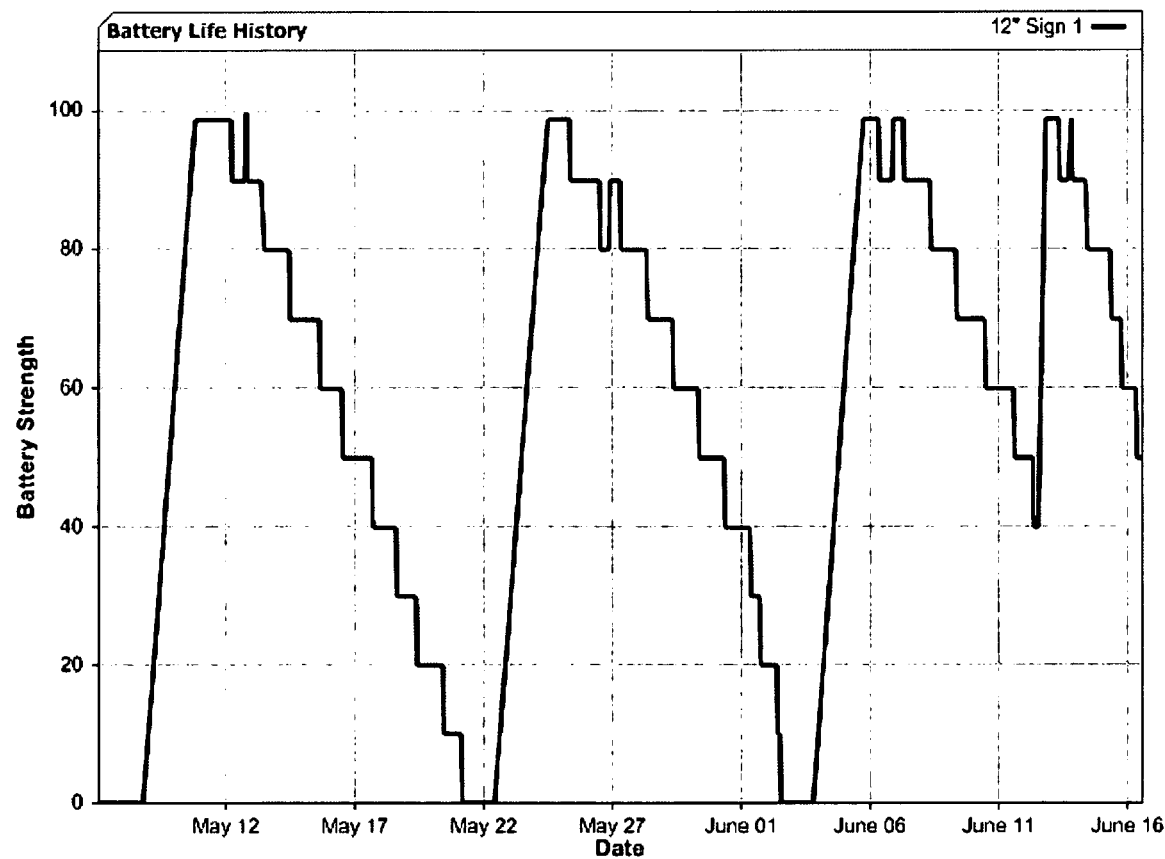

FIGS. 17-18: The Battery History Report request screen allows the user to enter a sensor unit and date range over which to generate a report providing the battery decay and recharge history. The battery history report shows a graph of the battery decay and can provide the user with a predictive trend of when they need to change the battery in a specific location. This charting, used in combination with other available data can show effects of location, time, day of the week, weather, sign settings and many other factors. This report can be selected by unit or by location.

Figure 19:
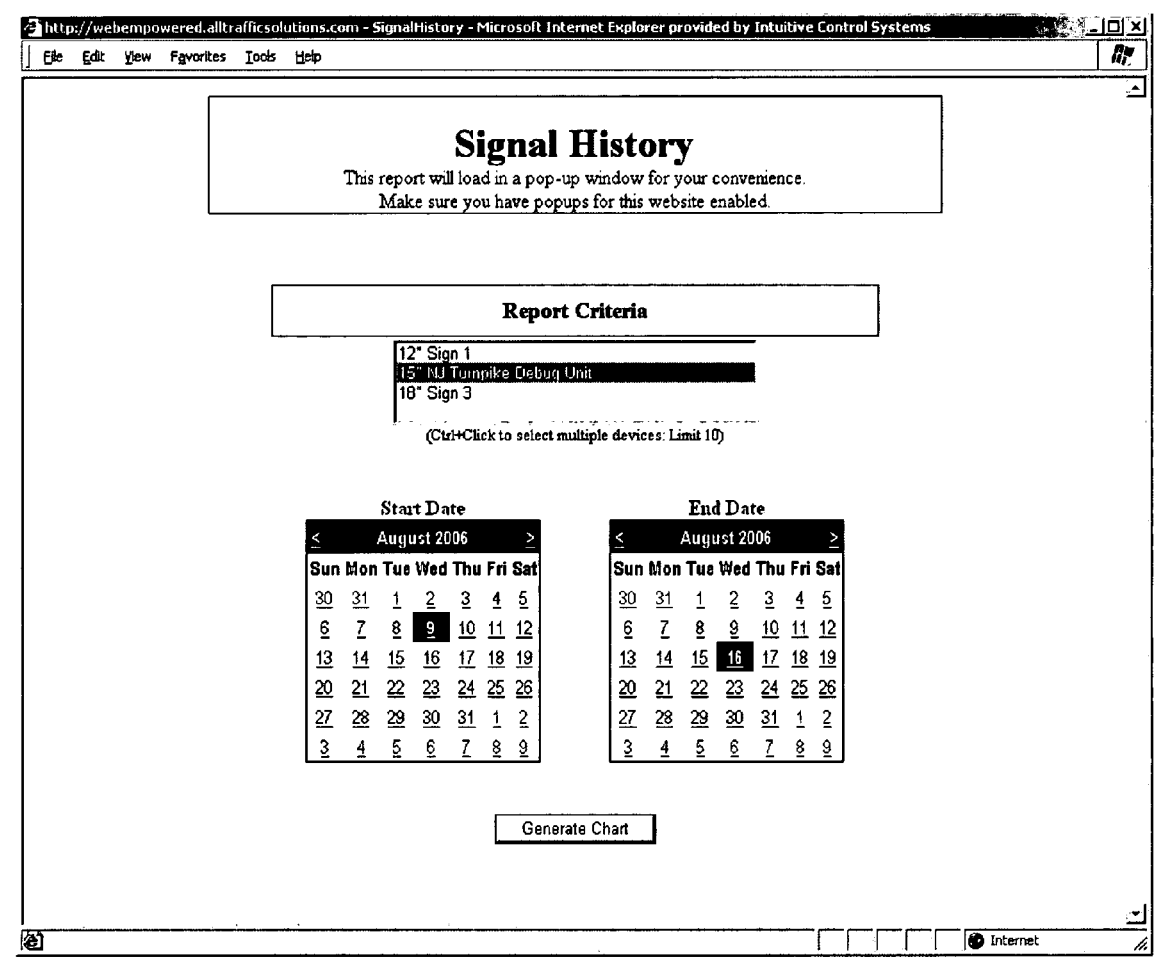
Figure 20:
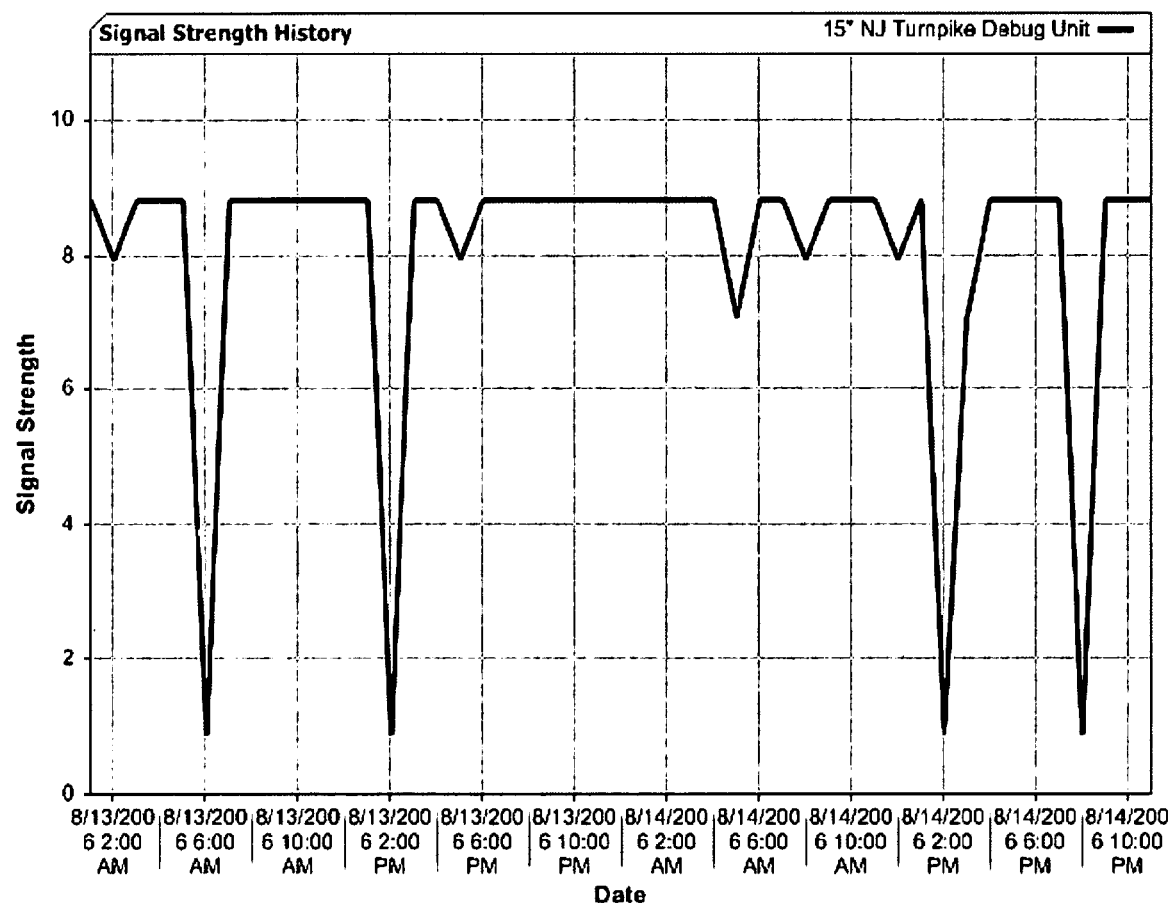

FIGS. 19-20: The Signal History Report request screen allows the user to select a unit and date range for which to review the cellular signal strength for a particular device at a specific location over a particular date range. The signal history shows a chart of the signal strength so the user can identify whether they have sufficient cellular signal strength in a particular location to reliably get the data back from the unit. It may also provide information of a particular time of day when the signal is the strongest and let the user schedule downloads at this time of day. This report can be selected by unit or by location.

Figure 21:
Figure 22:
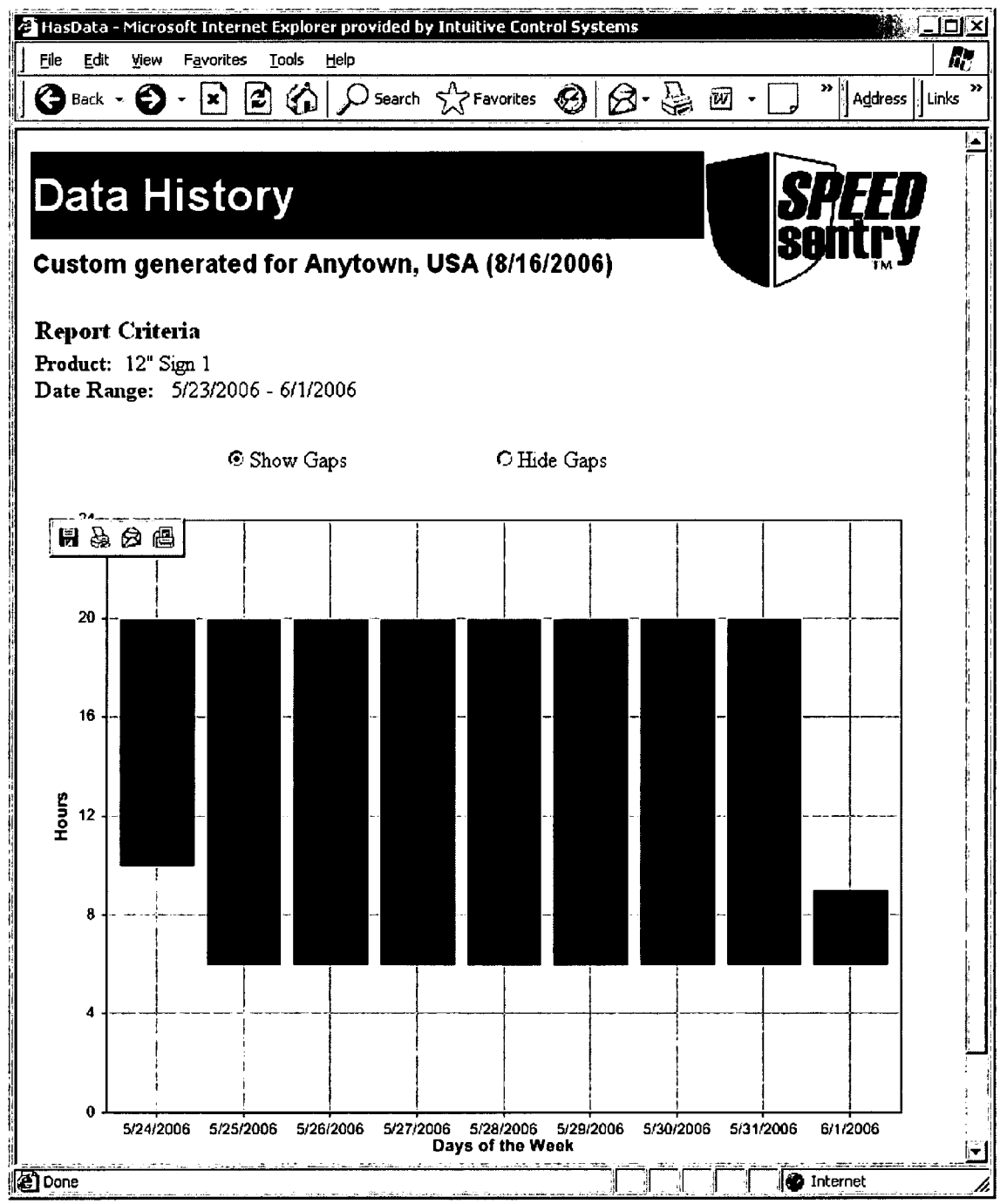

FIG. 21-22: The Data History Report request screen allows the user to select a unit or location and date range for which to generate a report to review the data availability history. This data history report shows that data exists for this particular sensor over the selected date range and provides a picture of the completeness of the data, and therefore the quality of the resulting reports. It lets the user visualize time gaps in the data for purposes of troubleshooting and for evaluation of the quality of reports generated from this data.

Figure 24:
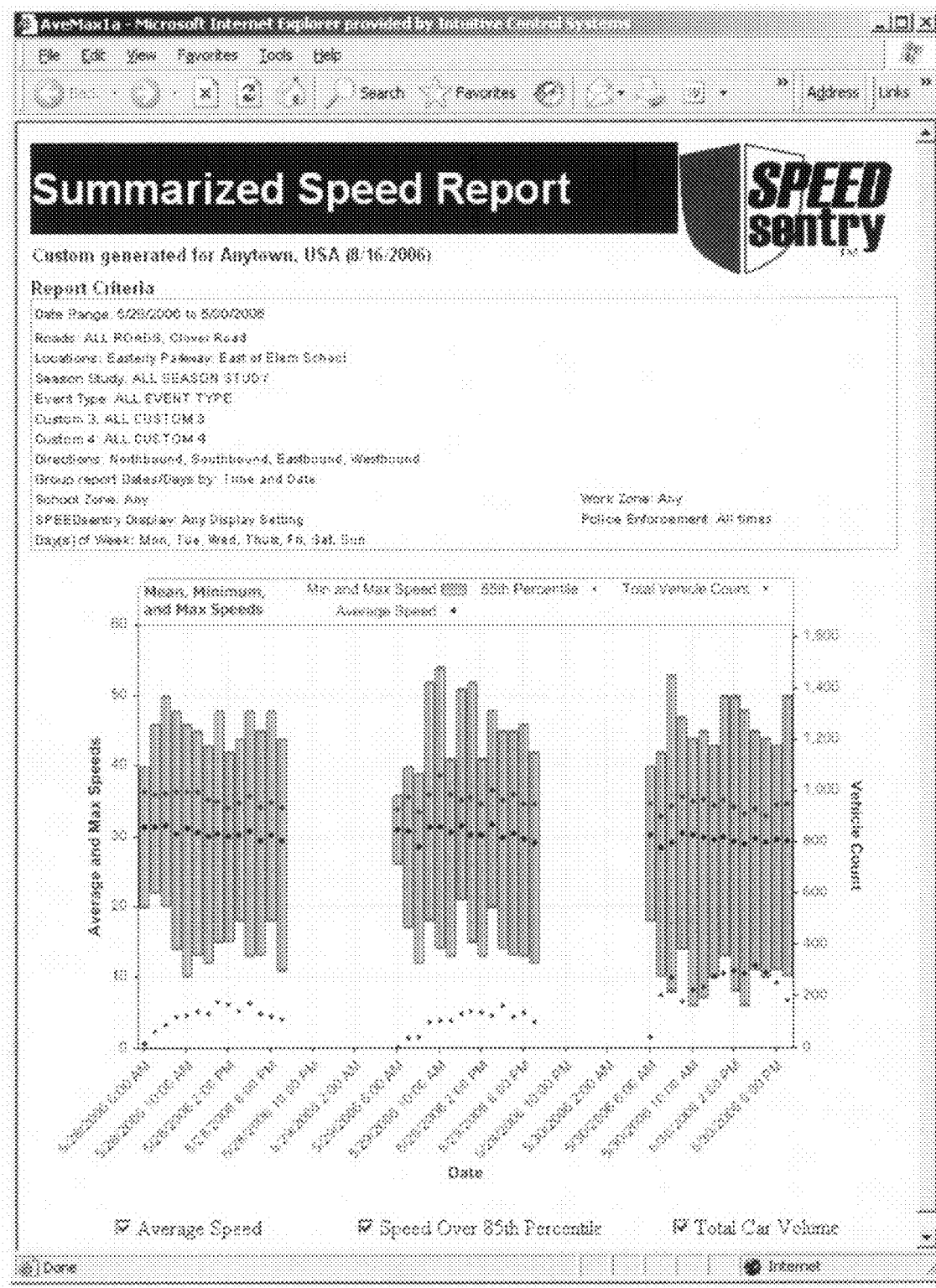

FIG. 23: The Graphical Trends Report request screen lets the user select the data criteria to generate the Summarized Speed Report (FIG. 24). For the criteria related to the report, they get to select all of the labels for each data field that they are using, what they want displayed on the report including average speed, $85^{th}$ percentile speed and total car volume.

FIG. 24: The Summarized Speed Report gives the user a quickly interpreted graphical summary of the speed situation for the selected data criteria. For the selected date range and data label filter criteria selected in the graphical trends report request screen, this chart provides the average speeds, maximum and minimum speeds, $85^{th}$ percentile speeds, and vehicle counts over the date and time range selected for a specific time reporting period breakdown. For example, the data could be reviewed in 1 hour time windows, 30 minute time windows or 15 minute windows or any appropriate window. This data is independent of the sensor unit, as the report is generated using the data labels only and the data is therefore independent of the sensor unit. It is also possible to look at a data set with the day averaged together, so the user can look for trends that are particular to a specific day of the week, such as higher speeds on a Friday night.

Figure 25:
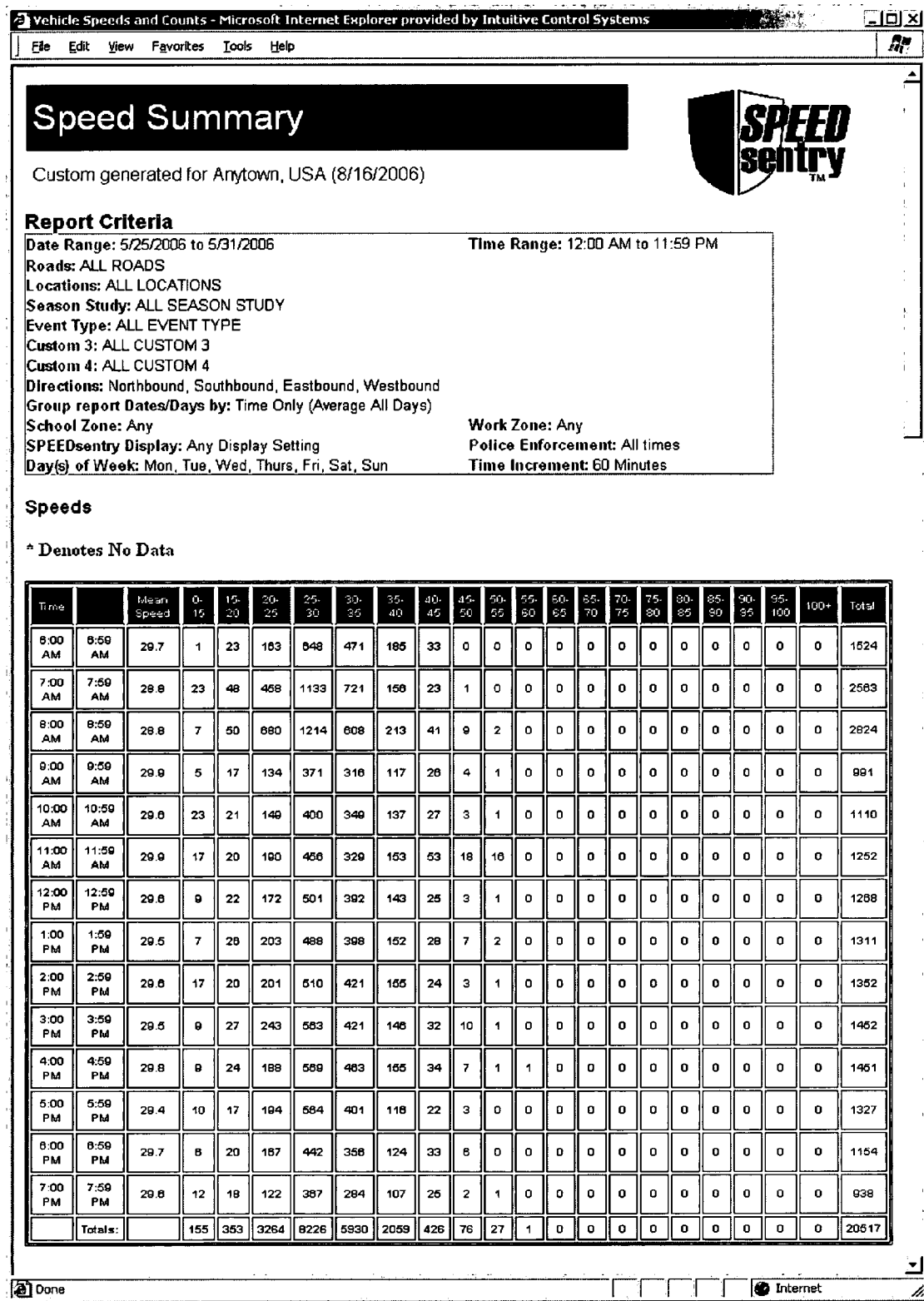

FIG. 25: This report is the Speed Summary Chart. This chart provides a vehicle count for each selected time window per selected speed grouping over the selected date range for the data with the data label criteria selected. All of the criteria are selected by the user when generating the report. The report also has the ability to color different blocks different colors depending on the count range so there is a visual picture of the periods and speeds with the highest vehicle counts.

Figure 26:
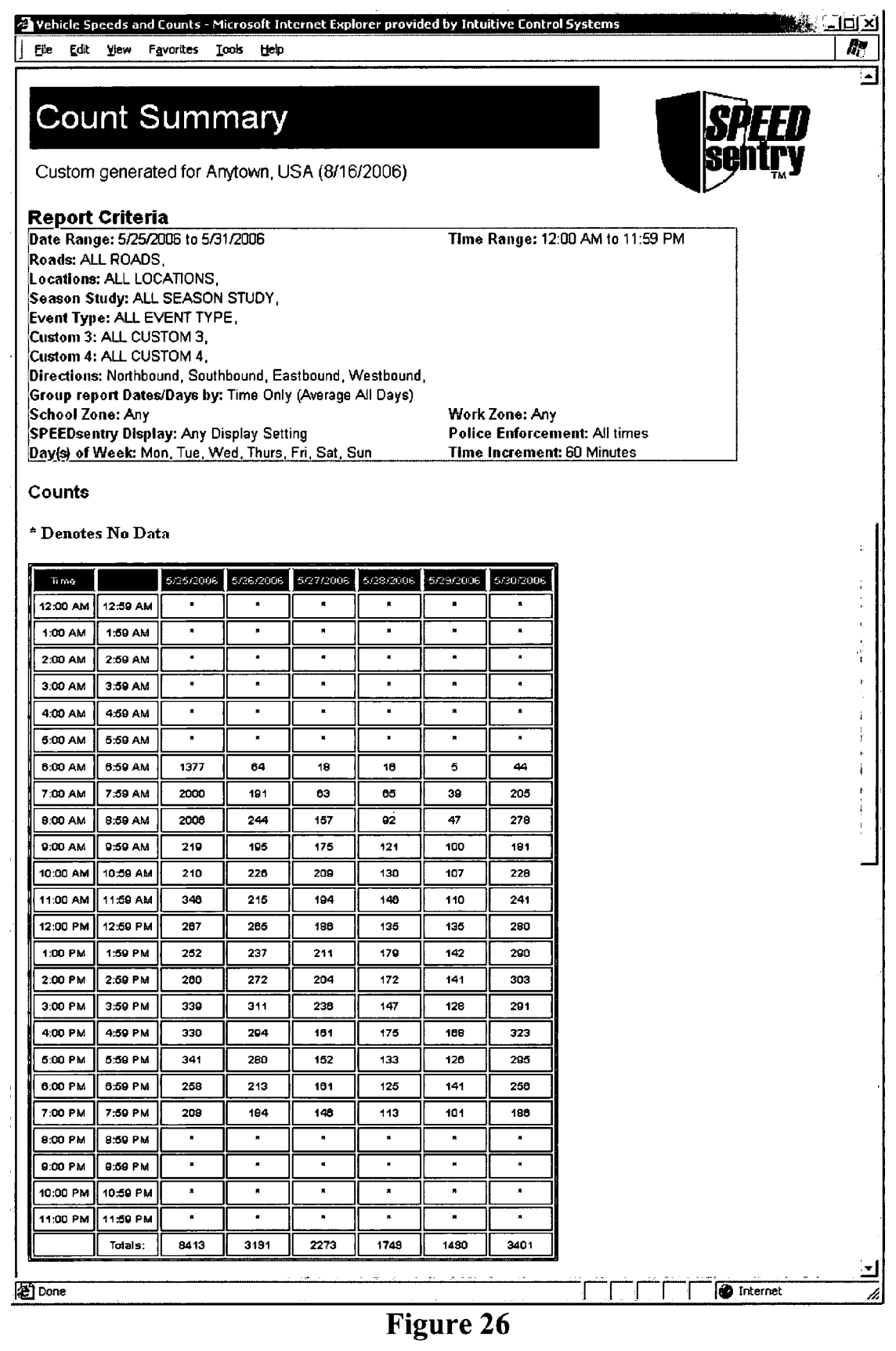

FIG. 26: This report is the Vehicle Count Summary Report. This chart provides a daily vehicle count for each selected time window over the selected date range for the data with the data label criteria selected. All of the criteria are selected by the user when generating the report. The report also has the ability to color different blocks different colors depending on the count range so there is a visual picture of the periods and days with the highest vehicle counts.

FIG. 27: One of the key reports of the WebEmpowered system is the Enforcement Priority Report. This report saves the user significant time in determining the enforcement priorities within his area of coverage. All of the sensors are providing data for the system, and this data is labeled upon upload with the user's data label criteria. The user selects the data label criteria including sensor location, school zone, road, side of street, etc, selects a data and time range, and the Enforcement Priorities report is generated. For the selected data range, this report automatically reports to the user the periods of highest speed violations and the highest individual speed events. The officer can use the time windows for enforcement priorities, and can also look at the high speed events to determine any trends from this data, potentially identifying a specific driver who passes at a high rate of speed near the same time daily. The report also generates a summary for all of the data sets used in the generation of the report. The same periods of high speed events can be highlighted to make events in the same time period on different days stand out as a potential regular violator. This helps the user identify this violator and respond with on-site enforcement during this time window. An example of how national averages are displayed alongside customer data is shown in the "Summary" portion of the FIG. 27.

Figure 29:
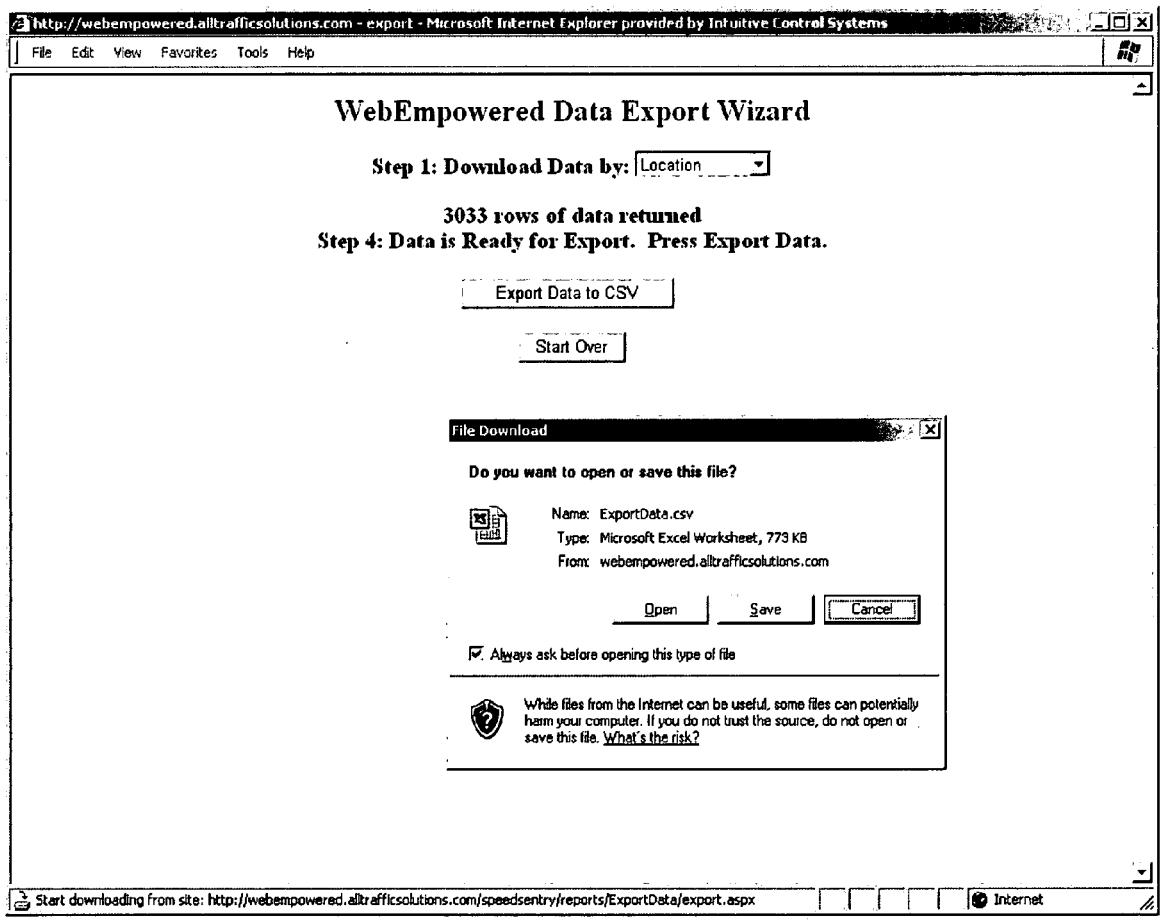

FIG. 29: The data export wizard allows the user to export the data from the database into their own system. This allows the user to take the raw data and perform their own calculations independent of the WebEmpowered system. This also allows the user to store their raw data outside of the WebEmpowered system if they prefer to do this.

FIG. 30: The Alert Notification Screen allows the user to set parameters for individual event alerts and then determine who gets these email alerts. Alerts include tamper alert sensitivity based on the sensitivity of the motion sensor in the speed display, an alert when the battery gets down to a selected percentage of remaining power, an alert that new data has been uploaded, an alert that traffic is moving under a selected speed indicating an accident or similar event, an alert for an individual high speed data recording above a selected speed that requires immediate attention or an alert that the effectiveness of on-site traffic enforcement has worn off as the speeds in the location have increased back to selected levels. Maintenance alerts can also be selected to receive system operation based alerts.

FIG. 34A-34B: The Road Report gives the user summary information that can help determine the traffic flow characteristics of a road or range of roads. For a selected data range, the system provides a report with the periods of maximum and minimum volumes and speeds. This data can be used to schedule road work during periods of minimum volume and minimum speed. The data timeframe for the window is adjustable so the user can enter the duration of the selected road maintenance and the system will report the best timeframe of this duration to perform the maintenance.

FIG. 35A: All reports criteria can be saved to the server so that they can be brought up very quickly at a later time (see FIG. 35B), or scheduled for automatic email delivery on a schedule set by the user.

FIG. 35B: If the user had previously saved report criteria, they can repopulate all of the filters with a single button click which saves times and provides consistent reporting across multiple users and report times.

FIG. 36: Users, while generating reports, can compare their data with other areas of the country to see where they stand in regards to effectiveness.

The present invention is most easily understood in the context of a radar speed trailer. However, the inventive features are applicable to any vehicle sensor device (a radar speed trailer is one embodiment of a vehicle sensor device), such as a stationery radar gun with no speed indicators. The vehicle sensor device may be trailer-mounted, pole-mounted, or free-standing. Accordingly, the phrase, "vehicle sensor device" is used most generically to refer to the devices described above.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method of creating traffic management reports, the method comprising:
    (a) providing one or more vehicle sensor devices, each device being at a different fixed location in a region, each device capturing data of vehicles that pass the device;
    (b) communicating the vehicle data to a central computer database that is located remotely from the vehicles; and
    (c) at the central computer database,
        (i) via a user interface, selecting one or more criteria from a plurality of criteria for filtering the vehicle data, and
        (ii) automatically creating one or more traffic management reports from the filtered vehicle data using the selected criteria, wherein each traffic management report incorporates vehicle data from a plurality of vehicles.

2. The method of claim 1 further comprising:
    (d) associating each device with one or more data fields, wherein at least some of the criteria includes one or more of the data fields.

3. The method of claim 1 wherein the vehicle data includes road congestion data.

4. The method of claim 1 wherein step (a) further comprises providing a plurality of simultaneously operating vehicle sensor devices.

5. The method of claim 1 wherein the vehicle data is for a plurality of previous, non-current times so as to allow for analysis of past vehicle data.

6. A computer-implemented method of creating traffic management reports, the method comprising:
   (a) providing one or more vehicle sensor devices, each device being at a different fixed location in a region, each device capturing data of vehicles that pass the device;
   (b) communicating the vehicle data to a central computer database; and
   (c) at the central computer database, periodically creating one or more traffic management reports from the vehicle data, wherein each traffic management report incorporates vehicle data from a plurality of vehicles, and wherein the vehicle data is for a plurality of previous, non-current times so as to allow for analysis of past vehicle data.

7. The method of claim 6 wherein step (a) further comprises providing a plurality of simultaneously operating vehicle sensor devices.

8. The method of claim 6 wherein the vehicle data is for a plurality of previous, non-current time windows and the vehicle data includes at least average or median vehicle speed for each of the time windows.

9. A computer-implemented method of creating traffic management reports, the method comprising:
   (a) providing one or more vehicle sensor devices, each device being at a different fixed location in a region, each device capturing data of vehicles that pass the device;
   (b) communicating the vehicle data to a central computer database; and
   (c) at the central computer database,
      (i) automatically creating one or more traffic management reports from the vehicle data, and
      (ii) electronically notifying selected recipients of at least one or more of the traffic management reports, wherein each traffic management report incorporates vehicle data from a plurality of vehicles, and wherein the vehicle data is for a plurality of previous, non-current times so as to allow for analysis of past vehicle data.

10. The method of claim 9 wherein step (a) further comprises providing a plurality of simultaneously operating vehicle sensor devices.

11. The method of claim 9 wherein the vehicle data is for a plurality of previous, non-current time windows and the vehicle data includes at least average or median vehicle speed for each of the time windows.

12. A computer-implemented method of creating traffic enforcement reports, the method comprising:
   (a) providing a plurality of vehicle sensor devices, each device being at a different fixed location in a region, each device capturing data of vehicles that pass the device;
   (b) communicating the vehicle data to a central computer database; and
   (c) at the central computer database, creating a plurality of different traffic enforcement reports from the vehicle data, each of the traffic enforcement reports including a plurality of different traffic locations and vehicle speed at each of the locations, wherein each traffic enforcement report incorporates vehicle data from a plurality of vehicles, and wherein the vehicle data is for a plurality of previous, non-current times so as to allow for analysis of past vehicle data.

13. The method of claim 12 wherein step (a) further comprises providing a plurality of simultaneously operating vehicle sensor devices.

14. The method of claim 12 wherein the vehicle data is for a plurality of previous, non-current time windows and the vehicle data includes at least average or median vehicle speed for each of the time windows.

15. A computer-implemented method of managing a network of vehicle sensor devices, each device capturing data of vehicles that pass the device, including vehicle speed data, the method comprising:
   (a) providing a plurality of vehicle sensor devices at a plurality of different fixed locations;
   (b) electronically communicating the vehicle data to a central computer database;
   (c) analyzing the vehicle speed data from each of the vehicle sensor devices to detect any vehicle sensor devices that are likely not operating properly with respect to vehicle speed detection;
   (d) the central computer database automatically generating an alert message which includes the identification of the vehicle sensor device that is likely not operating properly with respect to vehicle speed detection;
   (e) storing in the central computer database electronic contact information indicating alert message recipients for at least some of the vehicle sensor devices; and
   (f) automatically sending alert messages to the appropriate message recipients upon detection of vehicle sensor devices that are likely not operating properly with respect to vehicle speed detection.

16. The method of claim 15 wherein the vehicle sensor devices include radar guns for detecting vehicle speed, and step (c) further comprises determining if the radar gun in a vehicle sensor device is likely operating properly.

17. The method of claim 15 wherein step (c) is performed at the vehicle sensor device by detecting faulty data, the method further comprising:
   (g) the vehicle sensor device sending an electronic message to the central computer database indicating that the vehicle sensor device is likely not operating properly with respect to vehicle speed detection.

18. The method of claim 15 wherein step (c) is performed at the central computer database using vehicle speed data electronically communicated thereto.

19. A computer-implemented method of managing a network of vehicle sensor devices, each device being in electronic communication with a central computer database which (i) programs settings of the device, and (ii) receives data of vehicles that pass the device, the method comprising:
   (a) storing in the central computer database:
      (i) a plurality of fixed locations that the vehicle sensor devices can be placed at, and
      (ii) device settings for each fixed location; and
   (b) upon placing a vehicle sensor device at a particular fixed location previously stored in the central computer database, the central computer database communicating with the device to automatically program the device with the settings previously stored for that particular fixed location.

20. The method of claim 19 wherein the central computer database further stores (iii) one or more alert settings for at least some of the locations, each alert setting defining an alert condition, the method further comprising:

(c) generating an alert if an alert condition is detected by a device that is placed at a location associated with an alert setting.

21. An article of manufacture for creating traffic management reports, the article of manufacture comprising a computer-readable medium encoded with computer-executable instructions for performing a method comprising:
   (a) providing one or more vehicle sensor devices, each device being at a different fixed location in a region, each device capturing data of vehicles that pass the device;
   (b) communicating the vehicle data to a central computer database that is located remotely from the vehicles; and
   (c) at the central computer database,
      (i) via a user interface, selecting one or more criteria from a plurality of criteria for filtering the vehicle data, and
      (ii) automatically creating one or more traffic management reports from the filtered vehicle data using the selected criteria, wherein each traffic management report incorporates vehicle data from a plurality of vehicles.

22. The article of manufacture of claim 21 wherein the computer-executable instructions perform a method further comprising:
   (d) associating each device with one or more data fields, wherein at least some of the criteria includes one or more of the data fields.

23. The article of manufacture of claim 21 wherein the vehicle data includes road congestion data.

24. The article of manufacture of claim 21 wherein step (a) further comprises providing a plurality of simultaneously operating vehicle sensor devices.

25. The article of manufacture of claim 21 wherein the vehicle data is for a plurality of previous, non-current times so as to allow for analysis of past vehicle data.

26. An article of manufacture for creating traffic management reports, the article of manufacture comprising a computer-readable medium encoded with computer-executable instructions for performing a method comprising:
   (a) providing one or more vehicle sensor devices, each device being at a different fixed location in a region, each device capturing data of vehicles that pass the device;
   (b) communicating the vehicle data to a central computer database; and
   (c) at the central computer database, periodically creating one or more traffic management reports from the vehicle data, wherein each traffic management report incorporates vehicle data from a plurality of vehicles, and wherein the vehicle data is for a plurality of previous, non-current times so as to allow for analysis of past vehicle data.

27. The article of manufacture of claim 26 wherein step (a) further comprises providing a plurality of simultaneously operating vehicle sensor devices.

28. The article of manufacture of claim 26 wherein the vehicle data is for a plurality of previous, non-current time windows and the vehicle data includes at least average or median vehicle speed for each of the time windows.

29. An article of manufacture for creating traffic management reports, the article of manufacture comprising a computer-readable medium encoded with computer-executable instructions for performing a method comprising:
   (a) providing one or more vehicle sensor devices, each device being at a different fixed location in a region, each device capturing data of vehicles that pass the device;
   (b) communicating the vehicle data to a central computer database; and
   (c) at the central computer database,
      (i) automatically creating one or more traffic management reports from the vehicle data, and
      (ii) electronically notifying selected recipients of at least one or more of the traffic management reports, wherein each traffic management report incorporates vehicle data from a plurality of vehicles, and wherein the vehicle data is for a plurality of previous, non-current times so as to allow for analysis of past vehicle data.

30. The article of manufacture of claim 29 wherein step (a) further comprises providing a plurality of simultaneously operating vehicle sensor devices.

31. The article of manufacture of claim 29 wherein the vehicle data is for a plurality of previous, non-current time windows and the vehicle data includes at least average or median vehicle speed for each of the time windows.

32. An article of manufacture for creating traffic enforcement reports, the article of manufacture comprising a computer-readable medium encoded with computer-executable instructions for performing a method comprising:
   (a) providing a plurality of vehicle sensor devices, each device being at a different fixed location in a region, each device capturing data of vehicles that pass the device;
   (b) communicating the vehicle data to a central computer database; and
   (c) at the central computer database, creating a plurality of different traffic enforcement reports from the vehicle data, each of the traffic enforcement reports including a plurality of different traffic locations and vehicle speed at each of the locations, wherein each traffic management report incorporates vehicle data from a plurality of vehicles, and wherein the vehicle data is for a plurality of previous, non-current times so as to allow for analysis of past vehicle data.

33. The article of manufacture of claim 32 wherein step (a) further comprises providing a plurality of simultaneously operating vehicle sensor devices.

34. The article of manufacture of claim 32 wherein the vehicle data is for a plurality of previous, non-current time windows and the vehicle data includes at least average or median vehicle speed for each of the time windows.

35. An article of manufacture for managing a network of vehicle sensor devices, each device capturing data of vehicles that pass the device, including vehicle speed data, the article of manufacture comprising a computer-readable medium encoded with computer-executable instructions for performing a method comprising:
   (a) providing a plurality of vehicle sensor devices at a plurality of different fixed locations;
   (b) electronically communicating the vehicle data to a central computer database;
   (c) analyzing the vehicle speed data from each of the vehicle sensor devices to detect any vehicle sensor devices that are likely not operating properly with respect to vehicle speed detection;
   (d) the central computer database automatically generating an alert message which includes the identification of the vehicle sensor device that is likely not operating properly with respect to vehicle speed detection;
   (e) storing in the central computer database electronic contact information indicating alert message recipients for at least some of the vehicle sensor devices; and
   (f) automatically sending alert messages to the appropriate message recipients upon detection of vehicle sensor devices that are likely not operating properly with respect to vehicle speed detection.

36. The article of manufacture of claim 35 wherein the vehicle sensor devices include radar guns for detecting vehicle speed, and step (c) further comprises determining if the radar gun in a vehicle sensor device is likely operating properly.

37. The article of manufacture of claim 35 wherein step (c) is performed at the vehicle sensor device by detecting faulty data, and the computer-executable instructions perform a method further comprising:
   (g) the vehicle sensor device sending an electronic message to the central computer database indicating that the vehicle sensor device is likely not operating properly with respect to vehicle speed detection.

38. The article of manufacture of claim 35 wherein step (c) is performed at the central computer database using vehicle speed data electronically communicated thereto.

39. An article of manufacture for managing a network of vehicle sensor devices, each device being in electronic communication with a central computer database which (i) programs settings of the device, and (ii) receives data of vehicles that pass the device, the article of manufacture comprising a computer-readable medium encoded with computer-executable instructions for performing a method comprising:
   (a) storing in the central computer database:
      (i) a plurality of fixed locations that the vehicle sensor devices can be placed at, and
      (ii) device settings for each fixed location; and
   (b) upon placing a vehicle sensor device at a particular fixed location previously stored in the central computer database, the central computer database communicating with the device to automatically program the device with the settings previously stored for that particular fixed location.

40. The article of manufacture of claim 39 wherein the central computer database further stores (iii) one or more alert settings for at least some of the locations, each alert setting defining an alert condition, and the computer-executable instructions perform a method further comprising:
   (c) generating an alert if an alert condition is detected by a device that is placed at a location associated with an alert setting.

* * * * *